FIG. 1a

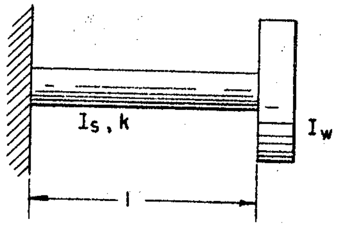

$I_w$ = WHEEL INERTIA-LB-IN-SEC.
$I_s$ = SHAFT INERTIA-LB-IN-SEC.
k = SHAFT STIFFNESS-IN-LB/RADIANS
$W_n = \sqrt{k l (I_w + \alpha C I_s)}$
= UNDAMPED NATURAL FREQUENCY

FIG. 1b

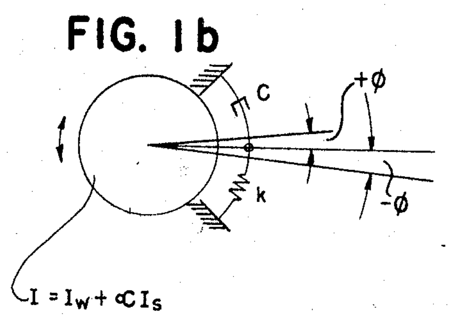

$I = I_w + \alpha C I_s$
$\alpha C = 1/3, (1/3 \text{ TO } .405)$
C = COEFFICIENT OF VISCOUS DAMPING
ϕ = ANGLE OF TWIST-RADIANS
$q = \sqrt{k/I - (c/2I)^2}$
= DAMPED NATURAL FREQUENCY

FIG. 1c

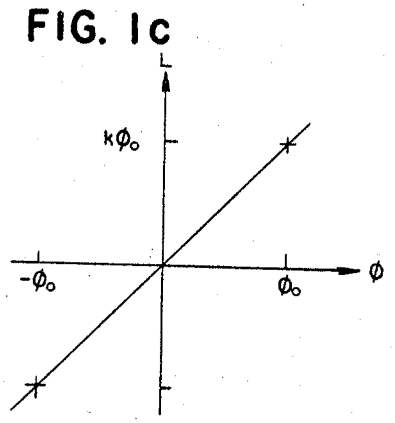

FIG. 1d

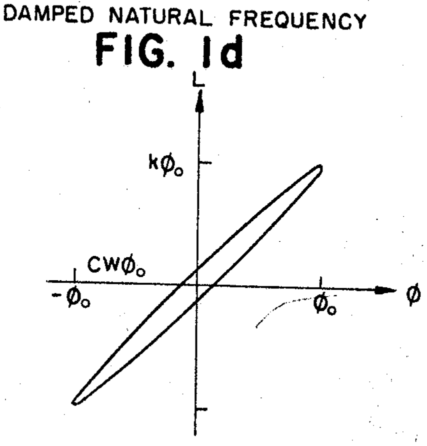

FIG. 1e

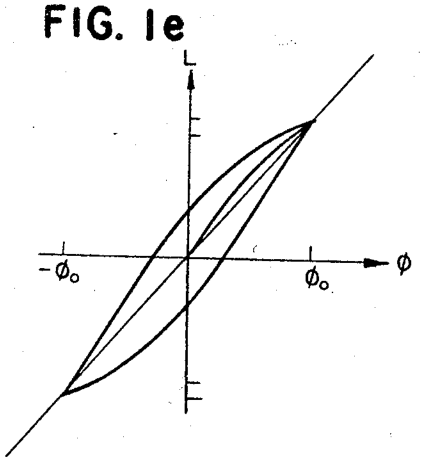

FIG. 1f

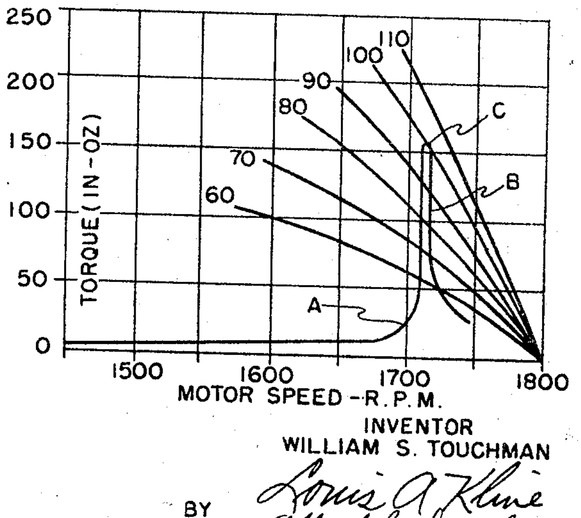

INVENTOR
WILLIAM S. TOUCHMAN
BY Louis A. Kline
Albert L. Seasholtz
Elmer Wargo
HIS ATTORNEYS INVENTOR
WILLIAM S. TOUCHMAN
BY Louis A. Kline
Albert L. Sessler, Jr.
Elmer Wargo
HIS ATTORNEYS INVENTOR
WILLIAM S. TOUCHMAN
BY Louis A. Kline
Albert L. Sessler, Jr.
Elmer Wargo
HIS ATTORNEYS June 10, 1969 W. S. TOUCHMAN 3,448,622

INTERMITTENT MOTION APPARATUS

Filed Aug. 11, 1967 Sheet 4 of 13

INVENTOR
WILLIAM S. TOUCHMAN

BY Louis A. Kline
Albert L. Sessler
Elmer Wargo

HIS ATTORNEYS

INVENTOR
WILLIAM S. TOUCHMAN

BY Louis A. Kline
Albert L. Sessler, Jr.
Elmer Wargo

HIS ATTORNEYS

INVENTOR
WILLIAM S. TOUCHMAN
BY Louis A. Kline
Albert L. Sessler
Elmer Wargo
HIS ATTORNEYS June 10, 1969 W. S. TOUCHMAN 3,448,622

INTERMITTENT MOTION APPARATUS

Filed Aug. 11, 1967 Sheet 7 of 13

INVENTOR
WILLIAM S. TOUCHMAN

BY Louis A. Kline
Albert L. Sesslup
Elmer Wargo

HIS ATTORNEYS

INVENTOR
WILLIAM S. TOUCHMAN
BY Louis A. Kline
Albert L. Sessler, Jr.
Elmer Wargo
HIS ATTORNEYS INVENTOR
WILLIAM S. TOUCHMAN
BY
Louis A Kline
Albert L Sessler
Elmer Wargo
HIS ATTORNEYS June 10, 1969 W. S. TOUCHMAN 3,448,622

INTERMITTENT MOTION APPARATUS

Filed Aug. 11, 1967 Sheet 10 of 13

INVENTOR
WILLIAM S. TOUCHMAN

BY Louis A. Kline
Albert L. Sesslin
Elmer Wargo

HIS ATTORNEYS

INVENTOR
WILLIAM S. TOUCHMAN
BY Louis A Klue
Albert L Seashup
Elmer Wargo
HIS ATTORNEYS INVENTOR
WILLIAM S. TOUCHMAN
BY Louis A Kline
Albert L Sessler
Elmer Wargo
HIS ATTORNEYS

INVENTOR
WILLIAM S. TOUCHMAN

BY Louis A. Kline
Albert L. Sessler
Elmer Wargo
HIS ATTORNEYS

United States Patent Office 3,448,622

Patented June 10, 1969

3,448,622

INTERMITTENT MOTION APPARATUS

William S. Touchman, Dayton, Ohio, assignor to The National Cash Register Company, Dayton, Ohio, a corporation of Maryland Filed Aug. 11, 1967, Ser. No. 660,031
Int. Cl. F16h 27/00
U.S. Cl. 74—1.5 23 Claims

ABSTRACT OF THE DISCLOSURE

An intermittent motion apparatus for use in ultra high speed indexing. The input member of the apparatus is rotated at a constant velocity while the output member thereof is oscillated at a resonant frequency relative to the input member. Magnetically operated and fluid operated oscillators act upon a resilient means so as to cause said output member to effectively dwell a desired number of times for each revolution of said input member. Said resilient means includes a solid shaft which is placed in torsion, magnetic springs, and solid elastomeric elements, like rubber, which are operated in compressions and shear modes.

*Cross references to related applications*

This application is related to the subject matter of United States patent application Ser. No. 609,378, filed on Jan. 16, 1967, now Patent No. 3,389,843 said application being filed by applicant and assigned to the same assignee as the present application.

*Background of the invention*

This invention relates to intermittent motion devices, and, more particularly, it relates to such devices which are capable of opertaing at ultra high stepping rates. These devices operate susbtantially at the resonant frequency thereof and are especially useful in devices such as high speed printers and tape punchers although not necessarily limited thereto.

One of the prior-art intermittent motion devices includes a clutch means which is operatively connected between a rotatable input and a rotatable output means. When the clutch means is actuated, the input motion is transmitted to the output means, and, correspondingly, when the clutch means is deactuated, the motion of the output means ceases. By controlling the frequency of clutch actuation and deactuation, different stepping or dwell rates can be obtained. The dwell rates in such a device are generally limited by the inertia of its moving parts when operating at high frequencies.

*Summary of the invention*

Stated generally, the device of this invention has an input means which is rotated at a constant velocity and a rotatable output means which is operatively connected to the input means via a resilient means. Also included in this invention is an oscillator means which acts upon said resilient means at substantially the resonant frequency of the device so as to enable said output means to effectively dwell a desired number of times for each revolution of said input means while said input means is rotated at said constant velocity. The resilient means includes fluid means such as a gas, magnetic springs, and elastic members such as torsion shafts. The oscillator means includes oscillators which are fluid operated and those of the magnetic variety. Means are provided to keep the device in resonance and to control the amplitude of its oscillation, so that time- and position-regulated "effective dwell" periods are obtained.

Experience with intermittent motion devices based on the disclosure of the previously named copending application, using torsion shafts as the resilient means at frequencies down to about twenty cycles per second, has demonstrated the following basic advantages for slower speed systems:

(a) smooth and quiet operation;
(b) low power requirements;
(c) indexing accuracy unaffected by wear;
(d) freedom from lubrication and maintenance; and
(e) ease of manufacture.

Most of these advantages listed above were obtained from applicant's devices of said copending application when said devices were operated at high frequencies; however, difficulty was experienced at some of the coupling areas therein in that these areas appeared to be focal points for high frequency energy dissipation. As an example, in one of said devices, two pairs of jaw tooth couplings were used to detachably connect opposed ends of a print drum to the resilient means of the device, said print drum being the output member thereof. Even though the tooth couplings were fabricated with the greatest precision, the contacting points of the tooth couplings appeared to be focal points for high frequency energy dissipation. As a result, the oscillation of the drum or output member was somewhat unpredictable and erratic. In addition, some high frequency sounds appeared to emanate from vibrations normal to the surface of said print drum indicating that a method and a means were required to confine all vibrations to the resilient means used in the device. To aid in the elimintaion of such high frequency sounds, the subject of "interface damping" was studied, and the results thereof were incorporated in the embodiments of the instant application.

Other advantages of this invention are apparent in intermittent motion devices which are operated under conditions which require that the steady intermitent motion be interrupted asynchronously and in such a way that the cyclic rhythm is not detrimentally disturbed. One such device is a multi-channel, paper tape punch which operates at a maximum rate of 250 cycles or punched rows per second. If the dwell time, during which punching takes place, occurs for a quarter of an operating cycle, as in a continuous harmonic motion type of system, the dwell time for said device corresponds to one millisecond, which is adequate for the punching operation. Because the coded information which is fed into such a paper tape punch is asynchronous in nature, the intermittent device which feeds the tape to the punch must also feed row after row of said tape in an asynchronous manner.

Additional advantages relating to linear and non-linear classes of resilient means used in the intermittent motion devices of this invention will become apparent upon reading the following description. The objects of the instant invention are:

(a) To provide intermittent motion devices which include asynchronous indexing;
(b) To provide intermittent motion devices which utilize non-linear resilient means and are capable of operating in resonance over a wide range of operating frequencies;
(c) To provide devices of the above type which are inexpensive to construct and maintain;
(d) To provide an intermittent motion device having a cylindrical drum as the output member thereof, the device being subject to a minimum of high frequency sound energy dissipation;
(e) To provide an intermittent motion device which is modular in construction;
(f) To provide an intermittent motion device which uses a fluid operated oscillator;

(g) To provide an intermittent motion device which uses a gas as the resilient means; and (h) To provide an intermittent motion device which uses an improved magnetic oscillator.

*Description of the drawings*

A description of the drawings is as follows:

FIGS. 1*a* to 1*f* inclusive are various geometrical models and graphs illustrating the principles used in developing this invention;

*Description of the preferred embodiments*

Figure 2A:
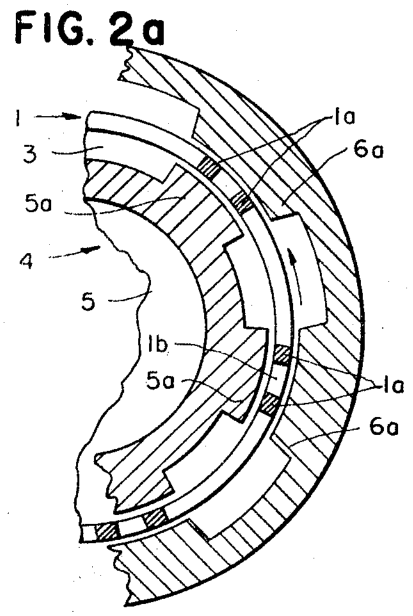
FIGS. 2*a* to 2*c* inclusive are cross-sectional views of a magnetic oscillator showing its rotor passing through different areas of the associated stator.

As stated earlier, high frequency energy dissipation was studied, and the results thereof were incorporated in the embodiments of the instant application, as it is important to keep both material damping and system or interface damping at a low level.

Material damping has been defined as the phenomenon by which energy is dissipated in a vibrating mechanical system consisting of a volume of macrocontinuous matter. The term "macrocontinuous" includes the damping originating at grain boundaries in metals, plastic slip or flow, dislocation movements, magnetomechanical effects, and inhomogeneous strain in fibrous materials. System or interface damping involves energy dissipation at interconnecting or distinguishable parts of an apparatus. A good example of system damping has already been given in relation to the jaw tooth couplings used to detachably connect opposed ends of a print drum to the resilient means used in the device. Even though these couplings were very carefully constructed and "lapped in" for almost perfect axial alignment, the mating surfaces of the tooth couplings began to show adverse wear effects, similar to fretting corrosion, after extended operation of the device.

The complete function of damping in the embodiments of this invention will be more readily understood if a systematic presentation of some of the analytical techniques for studying damping are reviewed. Experience with intermittent motion devices (based on said copending application and the embodiments of the present invention) over most of the useful frequency operating ranges, has indicated that all analytical analysis should be directed toward the steady-state conditions. Specifically, it has been found that the combined damping effects of most of the systems investigated (that is, systems which have a rotary oscillation superimposed on a steady rotation) quickly restore the system to a steady-state condition following a step change of one or more of the input control parameters.

An analysis of damping problems related to an intermittent motion device of the type using a shaft subjected to torsional oscillations might begin with the following differential equation of motion, which applies to a linear system:

Equation 1 $$I\ddot{\phi}+c\dot{\phi}+k\phi=L_0 \sin \omega t$$

The symbols referred to in the above equation refer to those used in conjunction with the geometrical models shown in FIGS. 1*a* and 1*b*. For an intermittent device of the above type to be precisely linear implies that the effective driven inertia I, the viscous damping coefficient *c*, the spring constant *k*, and the peak torque amplitude $L_0$ of the external (exciting) force, all remain constant. Assume first that the system under study has zero damping and is oscillating with a constant amplitude $\pm\phi_0$, which means that the exciter term $L_0 \sin \omega t$ is also zero. (The term $\pm\phi_0$ corresponds to the term $\phi_1$ used in said copending application.) With the above assumption, differential Equation 1 reduces to:

Equation 2 $$I\ddot{\phi}+k\phi=0$$

The general solution of Equation 2 is:

Equation 3
$$\phi=A \sin \sqrt{\frac{k}{I}}t+\beta \cos \sqrt{\frac{k}{I}}t$$

in which the term $$\sqrt{k/I}$$

refers to the angular natural frequency of the torsionally oscillating system, and in which Equation 4
$$\omega_n=\sqrt{\frac{k}{I}}$$

and

Equation 5
$$\int_n=\frac{1}{2\pi}\sqrt{\frac{k}{I}}$$

In the above equations, it is assumed that the inertia or mass of the spring (resilient member $I_s$) is zero, or is combined with the fixed inertia of the oscillating member ($I_w$). Exact equations were developed in said copending application for taking into account the inertia of the spring (resilient member) itself.

FIG. 1*c* is a graph showing a typical force vs. deflection curve for a theoretically undamped oscillating member in which deflection and torque curves are defined by the following relations respectively.

Equation 6 $$\phi=\phi_0 \sin \omega t, \text{ deflection}$$

Equation 7 $$L=L_0 \sin \omega t, \text{ torque}$$

If viscous damping and a harmonic excitation are added to the geometrical model shown in FIGS. 1*a* and 1*b* to maintain a constant amplitude of oscillation, Equation 1 applies, and, considering only the steady-state solution when the oscillation is defined by Equation 6, this latter equation may be rewritten in terms of frequency as follows:

Equation 8 $$\phi=\phi_0 \sin 2\pi ft$$

The net torque exerted on the inertia of $I_w$ (FIGS. 1*a* and 1*b*) by torsional spring (the shaft) and its assumed viscous damper is:

Equation 9 $$L=k\phi_0 \sin 2\pi ft+2\pi cf\phi_0 \cos 2\pi ft$$

Equations 8 and 9 define the relationship between L and $\phi$, and, when specific values are used in the equations, the results therefor may be plotted to produce the ellipse shown in FIG. 1*d*.

The energy dissipated in one cycle of oscillation is equal to the area of the ellipse shown in FIG. 1*d* and is:

Equation 10
$$W\int_0^{1/f} L\frac{d\phi}{dt}\,dt=2\pi^2 cf\phi_0^2=\pi c\omega\phi_0^2$$

When structural materials such as those which might be used for the torsion shaft of FIGS. 1*a* and 1*b* are actually used, the assumption made regarding viscous damping is not valid, and the problem becomes more complex. In fact, the relation of energy dissipation to stress level introduces a nonlinearity into the system, producing a mechanical hysteresis lop (FIG. 1*e*) of increased area over that shown in FIG. 1*d*. An approximate analytical treatment can be achieved if one lets:

E=specific damping energy, equal to area within stress-strain hysteresis loop of the material, in.-lb./in.$^3$/cycle, and $E_0$=total damping energy dissipated by the mechanical spring per cycle of vibration, in.-lb./cycle.

Before the total damping energy $E_0$ can be determined, the specific damping energy E must be related to the stress level $\tau$. A moderate amount of accumulated data for typical engineering materials illustrates the fact that the damping-stress relationship for all materials cannot be expressed by one simple function. For a large number of structural materials in the low-intermediate stress region (up to 70% of the fatigue strength at $2\times10^7$ cycles), the following relationship is reasonably satisfactory (from "Shock and Vibration Handbook," edited by Cyril M. Harris and Charles E. Grede, pages 36 and 37, volume 2, McGraw-Hill Book Company, 1961):

Equation 11 $$E=c_1\tau^\beta$$

in which $c_1$ and $\beta$ are empirical constants and $\tau$ is the stress level (lb./in.$^2$). In general, values of $\beta$=2.0 to 3.0 are common in the low-intermediate stress region but may be much larger at high stress levels.

In order to analytically determine the total damping energy $E_0$, it is necessary to somewhat solve the volume-stress function of the mechanical spring element. Broadly, one must solve the following expressions:

Equation 12
$$E_0\int_0^{V_0} E\,dV$$

which is a triple integral in which $dV=dx\,dy\,dz$, and E is regarded as a function of stress $\tau$ (as described above), with V being the volume and with *x*, *y*, and *z* being the associated space coordinates.

Exact solutions of the damping energy based on Equations 11 and 12 are complicated even for simple geometric shapes. For example, for a solid torsion shaft of uniform circular cross-section having a radius *r*, and a length *l*, and also having $\beta$ equal to an integer value of 2.0, the damping energy per cycle is:

Equation 13
$$E_0=2\pi c_1\left[\frac{\gamma}{gG}\phi_0^2\omega^2\frac{1}{\sin^2 \omega l\sqrt{\frac{\gamma}{gG}}}\right]\frac{r_1^4}{4}\cdot\frac{1}{2\omega\sqrt{\frac{\gamma}{gG}}}\left[\sin \omega l\sqrt{\frac{\gamma}{gG}} \cos \omega l\sqrt{\frac{\gamma}{gG}}+\omega l\sqrt{\frac{\gamma}{gG}}\right]$$

An analysis of Equation 13 shows that the minimum energy design would theoretically be one for a torsion shaft having zero length. Practically, the minimum energy design for a material with this characteristic ($\beta$=2.0) would be one of minimum shaft length consistent with maximum allowable stress.

For $\beta$=3.0.

Equation 14
$$E_0=2\pi c_1\left[\frac{\gamma G^2}{g}\phi_0^3\omega^2\right]\frac{r_1^5}{5}\left[\frac{1}{\sin^2 \omega l\sqrt{\frac{\gamma}{gG}}}-\frac{1}{3}\right]$$

By differentiating Equation 14 with respect to length $l$, and setting the result equal to zero, the optimum shaft length for minimum energy is given by Equation 15

$$l_{\text{min.}}=\frac{\pi}{4.139\omega}\sqrt{\frac{gG}{\gamma}}$$

The optimum shaft length for minimum stress was given in said copending application as $$l_{\text{min. stress}}=\frac{\pi}{3\omega}\sqrt{\frac{gG}{\gamma}}$$

Thus,

Equation 16

$$\frac{l_{\text{min. stress}}}{l_{\text{min. energy}}}=\frac{4.139}{3}=1.3797$$

Equation 16 compares Equation 15 with the equation for minimum stress and shows that, if a material exhibits the damping property $\beta=3.0$, the lowest energy dissipation per cycle will be achieved by shortening the shaft and allowing slightly higher stresses therein than that which would be produced with the minimum stress design. Using numerical integration techniques, any value of $\beta$ and $c_1$ may be selected and introduced in the following equation for the determination of the damping energy per cycle:

Equation 17

$$E_o=2\pi c_1\left[G\phi_o\omega\sqrt{\frac{\gamma}{gG}}\cos\left(\omega l\sqrt{\frac{\gamma}{gG}}\right)\right]^{\beta}\frac{r_1^{\beta+2}}{\beta+2}\int_{x=0}^{x=1}\cos^{\beta}\left(\omega x\sqrt{\frac{\gamma}{gG}}\right)dx$$

Even if one assumes that the basic equation (Equation 11) applies, the derivation of Equations 13 through 17 is also made on the basis that $c_1$ and $\beta$ are constants from the axis of the torsion shaft to its extreme outer surface; however, this latter assumption may be far from the truth, particularly for heat-treated materials, in which, for example, the hardness, the grain size, etc., may vary considerably from its outer surface to the interior of the specimen.

The above analytical procedure is useful in making design predictions for the horsepower required to overcome damping loss in a spring-mass system, particularly if a correlation has previously been established with several system designs using one uniform material for each of the spring elements. The damping losses in horsepower can be obtained from the following simple equation:

Equation 18

$$\text{Damping losses (HP)}=\frac{E_o x f}{12\times 550}$$

Damping present in the intermittent motion devices of said copending application and the instant invention must equate to the power input, which is equal to the sum of the following:

(a) Material damping,
(b) Exciter damping,
(c) Bearing damping,
(d) Air damping, and
(e) Interface damping.

In general, interface damping at the frequency of the fundamental mode vibration must be virtually eliminated. If it is initially present in an intermittent motion device, it will, in all probability, increase as the device continues in operation. It is important that the lumped sum of the remaining damping parameters listed above remain essentially constant, as greatly simplified means for maintaining a constant amplitude of oscillation of the shaft or the output member is thereby made possible.

Such a simplified means of operating an essentially linear device at or near resonance can be understood by referring to FIG. 1*f*. A plot of r.p.m. vs. torque of a system excited for rotary oscillation is represented by a rise curve portion A, a fall portion B, and a peak point C. As fully described in said prior application, the curve A C B is in reality a frequency curve, since $$f=D\times\text{r.p.m.}/60$$

in which D is the number of effective dwells per revolution of the forward rotation of the intermittent motion device. In operation, the system of FIG. 1*f* was maintained at a constant level of excitation. Operation at the resonant peak C in one embodiment of the invention corresponded to a steady-state input torque of approximately 158 in.-oz., with a motor speed of 1,710 r.p.m., and with a torsional oscillation amplitude of $\pm.018$ radian.

The other curves of FIG. 1*f*, labeled 60, 70, 80, 90, 100, and 110 (representing voltages), are speed-torque curves of an induction motor used to drive the oscillating system. The points where the motor speed-torque curves intersect the rise curve A of the vibrating system represent conditions of power balance; that is, the power output of the motor exactly balances the power required to overcome damping losses, or to maintain the corresponding peak-to-peak angle of the torsional oscillation. If the damping in the system and the motor characteristics therein remain constant, the angle of oscillation of the system will remain constant without the use of any control means.

If the motor voltage is increased to a point where its corresponding speed-torque curve (FIG. 1*f*) no longer intersects the rise curve A of the steady-state "damping torque," the system immediately goes out of resonance with a sharp increase in motor speed. Intersecting points of the motor's speed-torque curves with the fall curve B cannot be achieved, because, to operate successfully with the fall curve B, would require an electric motor whose output torque somehow managed to increase while the voltage thereto (to decrease its speed) was reduced. The foregoing method of operation for resonant oscillating systems is obviously not limited to induction motors, but any motor (series, D.C., etc.) which has similar speed-torque curves, either designed for the application or under positive voltage control, can be used.

A second form of damping present in intermittent motion devices is air damping; however, the effect of air damping is relatively unimportant when compared to the other forms of damping present, and it may be assumed to be constant and of a very low value, at least for oscillating structures which expose a minimum of vibrating surface normal to an air column.

On the other hand, bearing damping can be large enough to be quite objectionable and must be considered in all practical designs. For example, the use of standard ball bearings on a shaft oscillating at frequencies between approximately 500 and 3,000 cycles per second with an angle of oscillation of approximately .018 radian has proven to be unsatisfactory. In such cases, an angle of oscillation was reached beyond which the internal friction or damping losses of the bearing became excessive and unpredictable. The faulty performance of ball bearings under the high frequency-large angle oscillation appears to be caused by high forces created between the balls and the ball separator due to the high angular accelerations present.

The following bearing systems are listed in an approximate order of reliability for use on a shaft undergoing a high frequency intermittent motion, with the lowest and most constant damping types at the top of the list:

(a) Hydrostatic air (gas),
(b) Hydrostatic oil (fluid),
(c) Hydrodynamic oil (journal bearing), and
(d) Porous bronze, graphite, etc.

The hydrodynamic air or gas bearing, although workable, was omitted from the list because of high cost, difficulty in starting, lower reliability, and higher damping than the hydrostatic air bearing. Examples of some of the bearing types listed above will be included in the mechanisms to be described presently.

Exciter damping, or the damping present in the device which maintains the oscillating system at or near resonance, and at a constant amplitude, is the final system energy loss to be discussed. The construction of the "exciter," or "magnetic oscillator," was fully described in said copending application. The latter name was used in said copending application to identify a means for providing excitation at the resonant frequency of a torsionally vibrating system using either an electromagnet or a permanent magnet as the primary source for force generation.

The intermittent motion devices of said copending application and the instant invention are based on the excitation of a spring-mass system in which devices it is extremely difficult to separate the exciter damping losses from the material damping losses of the spring or resilient element; however, since the primary concern is with the mechanical "Q" of the overall system, keeping these two damping losses grouped together presents no problem. For example, if an intermittent motion device includes a torsion shaft for the resilient member, and an oscillator which is magnetically operated, and if the design of said device is also such that the bearing damping and air damping related to the torsional oscillation at the fundamental frequency of the device can be neglected, then the power input of the mechanism during continuous intermittent operation thereof, minus the power input required for steady rotation without oscillation, equals the power required to overcome the losses in the spring member (material damping in torsion shaft), in the exciter (magnetic hysteresis), and at any interconnecting joints exposed to the fundamental frequency (interface damping).

Therefore, if the total damping power is known for a given system which is oscillating at a constant angle $\pm\phi_0$ at or near resonance, the approximate Q of the system can be determined by the following relations:

Equation 19 $$Q=\frac{2\pi W}{\Delta W}$$

in which W is the stored energy in the vibrating system, and $\Delta W$ is the energy dissipated per cycle, as previously described. If the effective inertia I (lb.-in.-sec.$^2$), the frequency $f$, and the angle of oscillation $\phi_0$ (radians) are known, the stored energy in the vibrating system is given by:

Equation 20 $$W=\tfrac{1}{2}I(\dot{\phi})^2_{max}$$

From Equation 8, the formula for angular velocity may be written as follows:

Equation 21 $$\dot{\phi}=2\pi f\phi_0\cos 2\pi ft$$

From Equation 21, a maximum occurs when $t=o$, and

Equation 22 $$(\dot{\phi})_{max}=2\pi f\phi_0$$

Substituting Equation 22 in Equation 20 yields

Equation 23 $$W=2\pi^2 If^2\phi^2 \text{ (in.-lb.)}$$

If $P_d$ equals the combined damping power when the peak angle of oscillation is $\pm\phi_0$, (HP), then the energy dissipated per cycle due to damping is Equation 24 $$\Delta W=\frac{12\times 550\times P_d}{f}=\frac{6600P_d}{f} \text{ (in. lb.)}$$

Substituting Equations 23 and 24 in Equation 19 gives:

Equation 25 $$Q=\frac{\pi^3 If^3\phi_o^2}{1650P_d}=\frac{.0188If^3\phi_o^2}{P_d}$$

It has been shown that material damping increases at greater than a linear rate with increases in stress level; similarly, it has becomes apparent that in an electromagnetic exciter, damping loss increases at greater than a linear rate with increases in impressed coil voltage. The material damping losses in the spring or resilient element of a given system are determined by the steady-state angle of oscillation and its frequency. Power to sustain the steady-state vibration is supplied by the exciter, and its power level is precisely related to the damping loss power. Therefore, the material damping of the spring or resilient element also determines the damping of the exciter, and this fact makes the selection of the material for the resilient element of prime importance in the design of a system so that the combined damping effects will not be too great or too low for practical operation of the system.

Performance of the magnetic excitation devices disclosed herein has been quite satisfactory; however, for high frequency operation, another system, to be described, has certain advantages. These advantages will be described in relation to the specific embodiments disclosed herein.

After having reviewed some of the analytical techniques used in studying the problem of damping, it seems appropriate to describe how the subject of damping applies to the specific embodiments disclosed herein; however, before so doing, a general discussion of the various elements used in the intermittent motion devices will first be given.

Figure 12:
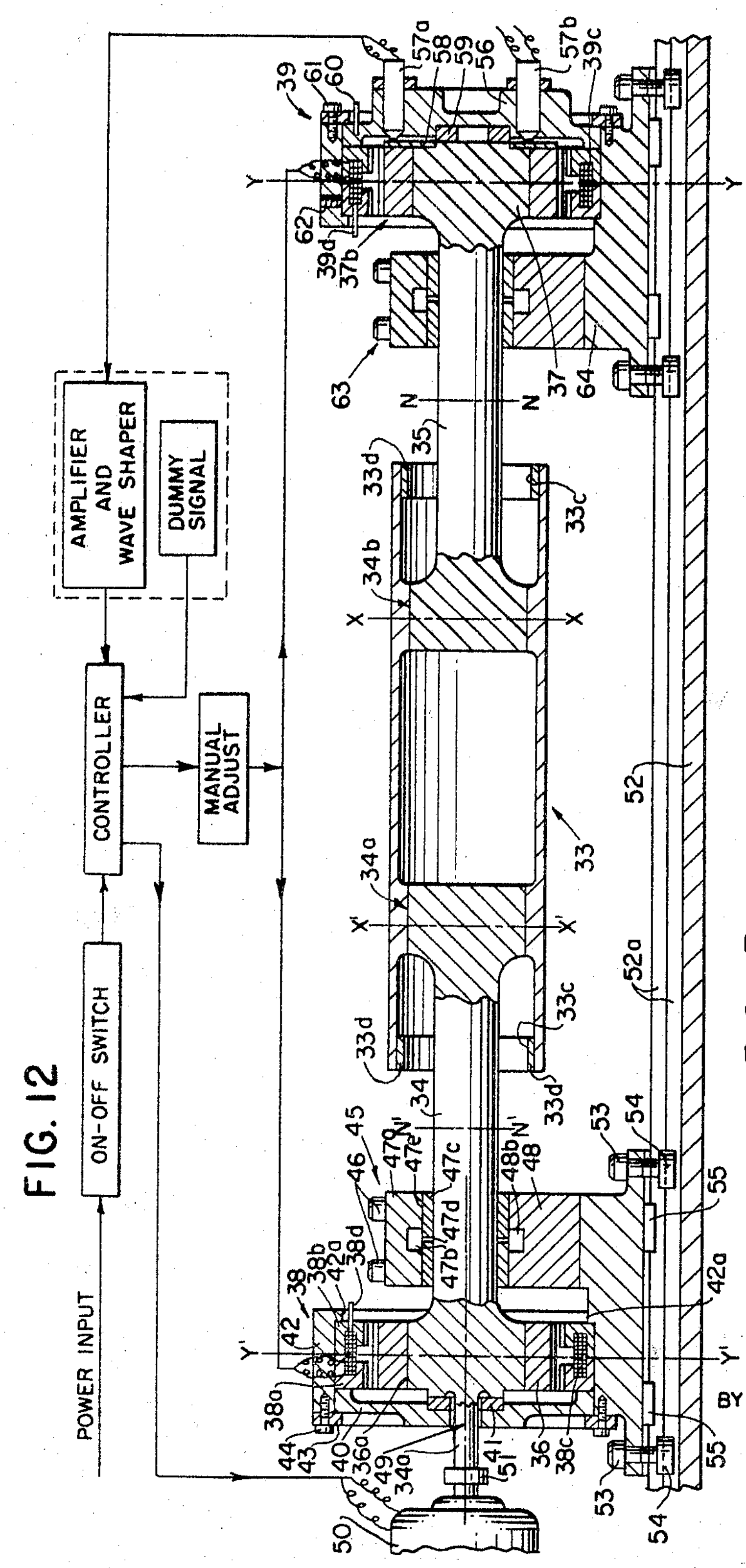
FIG. 12 is an elevational view, partly in cross section, showing one embodiment of the invention, which uses torsion shafts for the resilient means, a magnetic oscillator for the oscillator means, and a cylindrical drum for the output member of the device.

FIG. 12 shows one embodiment of this invention which can be used to illustrate the general relationship of the various elements included therein. The output member of the device includes a drum 33, which is supported at opposed ends thereof by shafts 34 and 35, which in turn are rotatably supported in bearings 45 and 63, respectively. The drum 33 is fixed to said shafts 34 and 35 to rotate therewith. One end 34$a$ of the shaft 34 is rotated by a motor 50, which is driven at a constant speed. In this embodiment, the resilient means employed includes the shafts 34 and 35, which are subjected to a torsional strain when the oscillator means is energized. The oscillator means shown in FIG. 12 comprises two magneticaly-operated oscillators 38 and 39, which, when energized, act upon the shafts 34 and 35, respectively, to restrain their rotation, thereby causing said drum 33 to periodically dwell at substantially the resonant frequency of the device a predetermined number of times for each complete revolution of said shafts 34 and 35.

While the embodiment of FIG. 12 has been described only generally, it serves to illustrate the general relationship of the basic elements included in the intermittent motion devices of this invention. In the descriptions of the specific embodiments which are to follow, only those elements of the devices which are novel will be described in detail; for example, FIGS. 2$a$ to 2$c$ inclusive, and FIGS. 3 and 4, show a magnetic oscillator which may be used in the general arrangement of the embodiments shown in FIGS. 12 and 14.

FIGS. 2$a$ to 2$c$ inclusive are cross-sectional views of a magnetic oscillator showing its rotor passing through different areas of its associated stator. The rotor includes a cylindrical element 1, which rotates between spaced opposed stator poles. This cylindrical element 1 may be utilized in an embodiment similar to that shown in FIG. 14, in which the cylindrical element is actually an extension of a drum 72.

Referring again to FIGS. 2$a$ to 2$c$ inclusive, the rotor and the stator of the oscillator shown therein are magnetically coupled as follows. The cylindrical element 1, which has a rotating axis 2, rotates in close proximity to the stator designated generally as 4. The stator 4 has an inner stationary, cylindrical member 5 whose axis is coincident with the axis 2, and which member 5 is provided with a plurality of pole faces 5$a$, which are equally spaced around its perimeter. The stator 4 also includes an outer stationary, cylindrical member 6, whose axis is also coincident with the axis 2, and which member 6 is provided with a plurality of poles 6$a$, which are equally spaced around its inner wall so as to be in spaced opposed relation with said poles 5$a$ to permit said cylindrical element 1 to freely rotate therebetween. The cylindrical element 1 is secured to an oscillating wheel or drum 3 (FIGS. 3 and 4), which also has a rotating axis coincident with the axis 2. The drum 3 is comparable in function to the drum 72, previously mentioned in connection with FIG. 14. The cylindrical members 5 and 6 of the stator 4 cooperate as shown in FIG. 4 to encase the coil 7, which is part of the magnetic coupling previously mentioned, said members 5 and 6 being made of magnetically "soft" material, so that the magnetic field strength between opposing pole pairs (5*a* and 6*a*) may be varied by controlling the voltage to the coil 7.

Figure 2B:
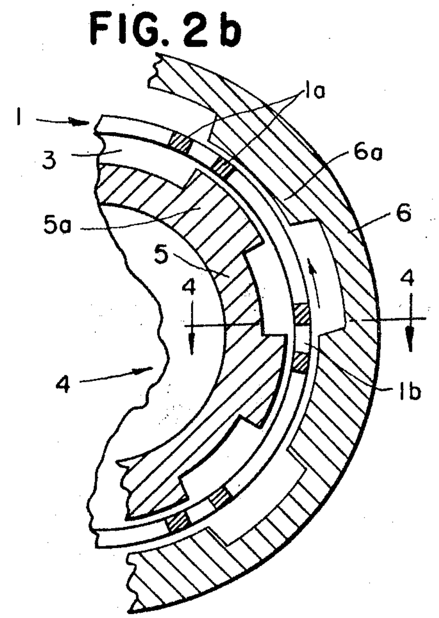
Figures 2C, 3, 4:
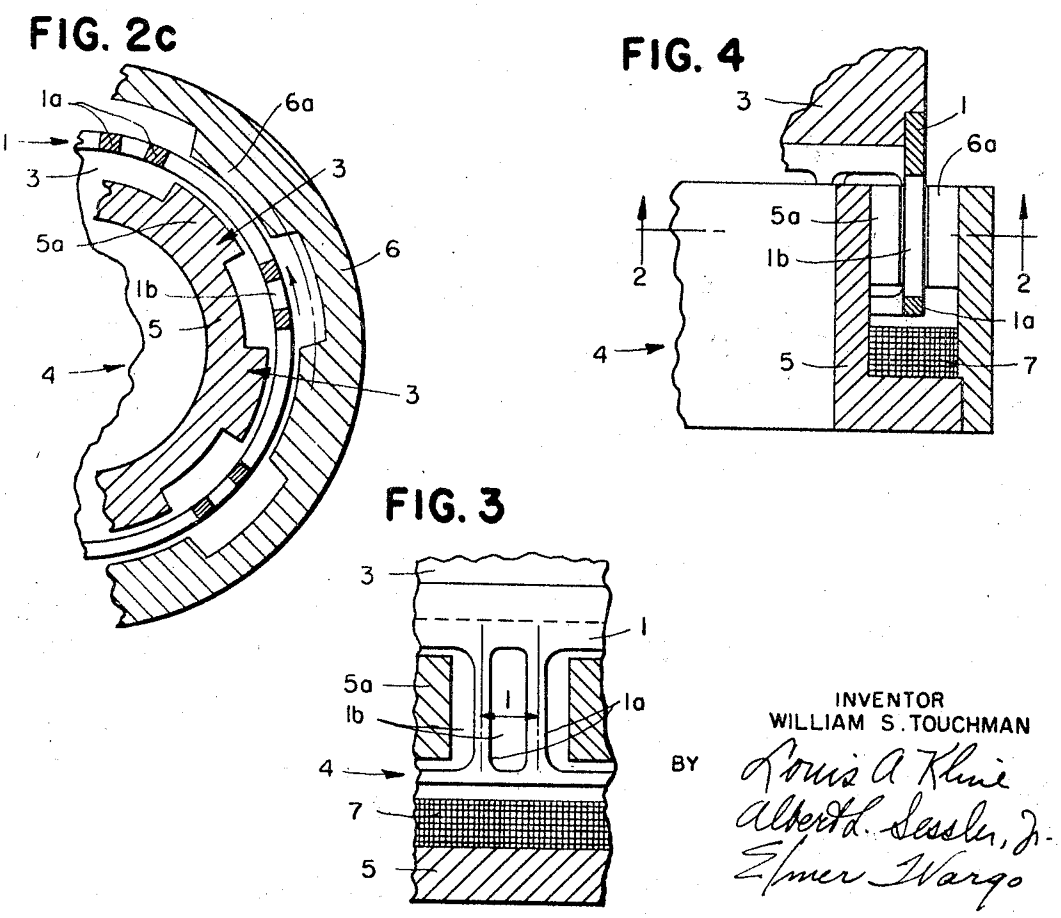
FIG. 3 is a cross-sectional view taken along the line 3—3 of FIG. 2*c* and shows a portion of the rotor construction.
FIG. 4 is a cross-sectional view taken along the line 4—4 of FIG. 2*b* and shows more details of the rotor construction.

In the magnetic path of the oscillator shown in FIGS. 2*a* to 2*c* inclusive, and FIGS. 3 and 4, the cylindrical element 1 is provided with a plurality of conductor loops 1*a*, which are equally spaced around its perimeter. The cylindrical element 1 also has void areas 1*b* (FIG. 3) adjacent to said loops 1*a*, or said areas may be filled with a non-conductive material, so as to increase the torsional stiffness of the element 1, as may be required by its design.

The principle of operation relating to the magnetic oscillator just described is that a force is generated when a closed conductor loop is moved through a stationary magnetic field of varying intensity. In FIG. 2*a*, the conductor loops 1*a* are in a uniform magnetic field of maximum strength, and the voltage generated by the motion of the cylindrical element 1 in each of the separate conductors is equal, so that no current flows in the conductor loops 1*a*. A similar situation exists when the conductor loops 1*a* are in a field of minimum strength, as illustrated in FIG. 2*c*; however, when the conductor loops 1*a* are passing out of a magnetic field of maximum strength, as shown in FIG. 2*b*, unequal voltages are generated in each side of the individual loops 1*a*. As a result, unequal voltages are generated on each side of the loops, and the net voltage difference thereacross causes a current to flow in each loop, resulting in the creation of a drag force which opposes the motion of the cylindrical element 1. Likewise, when the conductor loops 1*a* are passing into a magnetic field of maximum strength (not shown), current is produced in said loops, so as to produce a force which opposes the motion of the cylindrical element 1.

The mangetic oscillator (FIGS. 2*a* to 2*c* inclusive) just described provides a simple means for producing the excitation necessary for some embodiments of the intermittent motion devices of this invention. As an illustration, the number of pole pairs (5*a* and 5*b*) of the stator 4, and the number of conductor loops (1*a*) of the rotor may both be conveniently made to equal one half the number of effective dwells ($D/2$) desired per revolution of the forward rotation of the input member of the device with which the magnetic oscillator is used. This feature will be more easily understood in connection with the description of FIGS. 5*a* to 5*f* inclusive.

A careful study of the various embodiments of this invention has revealed that, when the dwell therein lasts for approximately one quarter-cycle, the mathematical formula expressing this relationship can be written as:

Equation 26

$$\phi_o = \frac{\pi \sec 45°}{4D} = \frac{1.1072}{D} = \frac{1.11072}{D} \text{ radians}$$

Figures 5A, 5B:
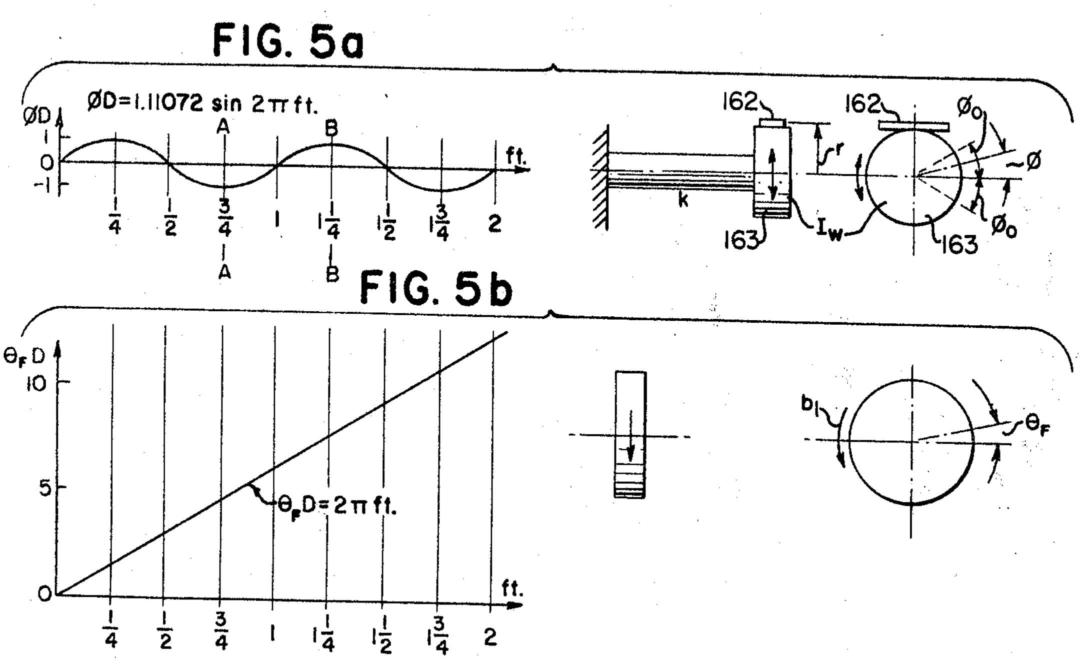
FIGS. 5*a* to 5*f* inclusive are various geometrical models and graphs illustrating the principles used in developing this invention.

The above formula can be explained in relation to the geometrical model shown in FIG. 5*a*, which represents a "stationary" oscillating system. The system includes an inertia wheel (or drum $I_w$, which is secured to one end of a shaft $k$, whose remaining end is fixed. When the wheel $I_w$ is put in motion, it oscillates through an angle $\pm\phi_o$ as shown. The parameter D, which is the effective number of dwells per revolution of the wheel $I_w$, is introduced into the mathematics of the system even though the wheel $I_w$ does not rotate continuously in one direction. When $\phi D$ is plotted against cycle time $ft$, the graph shown in FIG. 5*a* results.

When a wheel or drum rotates continuously in one direction ($b_1$ as shown in the geometrical model in FIG. 5*b*) and at a constant velocity, the following results obtain. The angular displacement $\theta_F$ may be predetermined to be $2\pi ft/D$. When $\theta_F$ is plotted against the cycle parameter ($ft$), the graph as shown in FIG. 5*b* results.

Figures 5C, 5D, 5E:
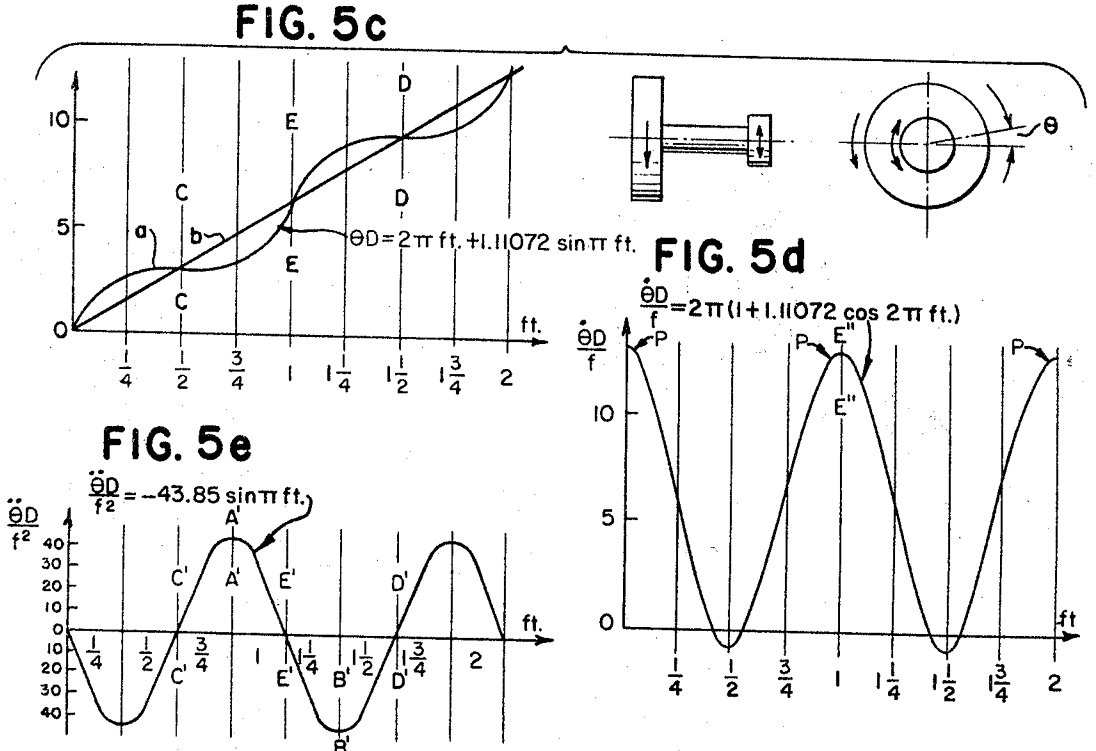

The curve shown in the graph of FIG. 5*c* represents the sum of the curves shown in the graphs of FIGS. 5*a* and 5*b*, and the equation for this curve corresponds to the equation developed in said copending application, which is as follows:

Equation 27 $$\theta = \frac{2\pi ft}{D} + \phi_o \sin 2\pi ft$$

Substituting Equation 26 in Equation 27 and multiplying through by D gives the equation for the normalized plot shown in FIG. 5*c*:

Equation 28 $\theta D = 2\pi^t + 1.11072 \sin 2\pi ft$

Figure 5F:
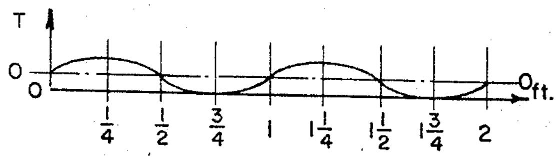
Figure 6A:
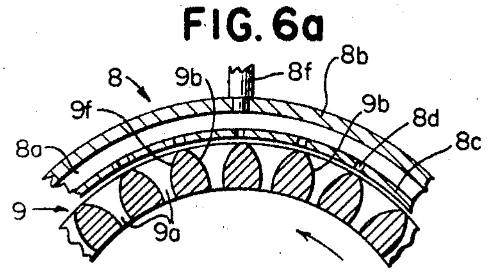
FIGS. 6*a* to 6*d* inclusive are cross-sectional views of a fluid-operated oscillator with its rotor in various positions relative to the discharge parts in the plenum.
Figure 6B:
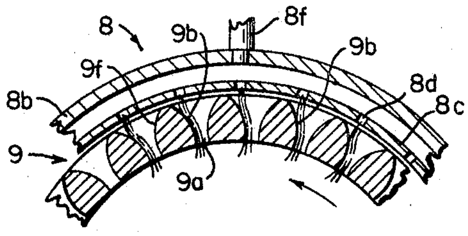
Figure 6C:
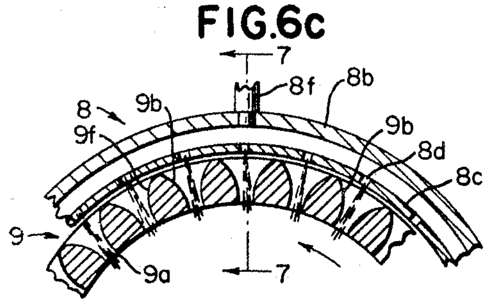
Figure 6D:
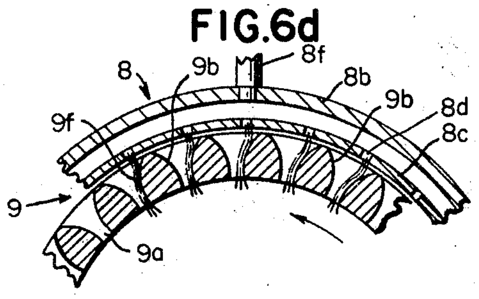

The curve shown in the graph of FIG. 5*d* represents a normalized plot of angular velocity vs. $ft$ for the wheel or drum 3 shown in FIGS. 3 and 4, and FIG. 5*e* represents a normalized plot of said drum's acceleration. FIG. 5*f* is a plot of the exciter drag torque (T) vs. cycle time ($ft$) for the magnetic oscillator (FIGS. 2, 3, and 4) and shows how the high torque portions of the curve correspond to decreasing velocity portions of the velocity curve (FIG. 5*d*), thereby allowing the induction type exciter to effectively impart energy into the resonant system to balance the steady-state damping losses, as previously described. The waveform of the torque curve of FIG. 5*f* can be altered by changing the distance $l$ between opposed portions of the conductor loops 1*a* (FIG. 3), or by altering the design of the pole faces 5*a* and 6*a*, or both. For proper action and greatest efficiency, the conductor loops 1*a* and the pole faces 5*a* and 6*a* must be evenly spaced around the center line 2.

The advantages of the magnetic oscillator shown in FIGS. 2, 3, and 4 over the magnetic type described in said copending application are that it adds less inertia to the wheel or drum inertia $I_w$, and is more efficient at the higher frequencies.

Figure 7:
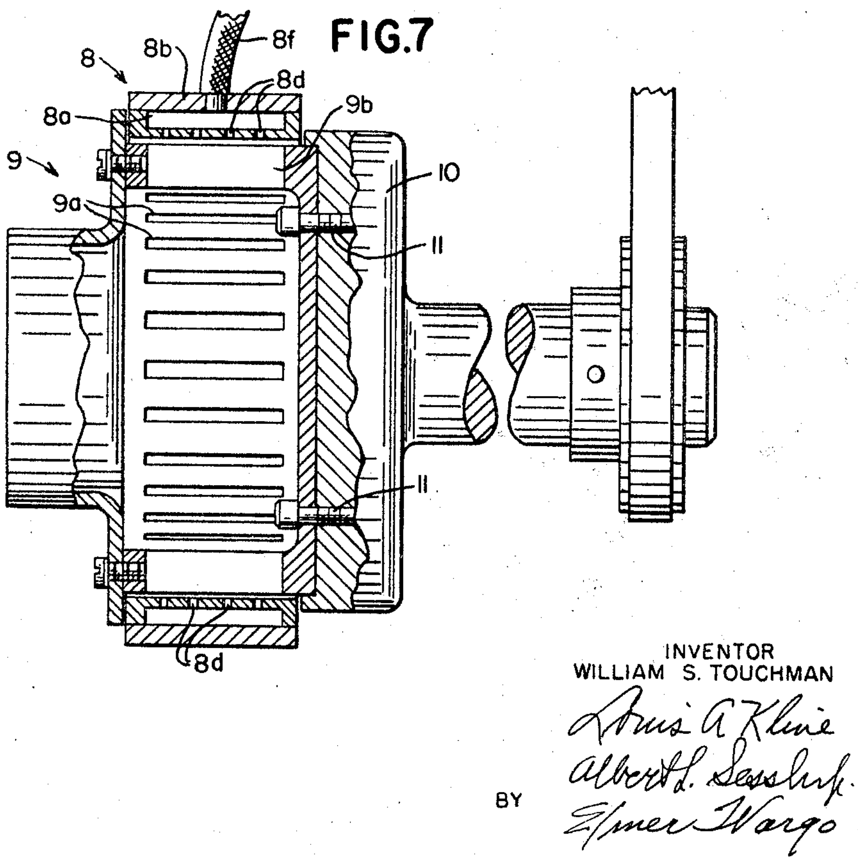
FIG. 7 is a cross-sectional view taken along the line 7—7 of FIG. 2*c* and shows the relationship of the fluid-operated oscillator to a resilient means which is actually a torsion shaft.

A second modification of the oscillator means used in this invention includes an oscillator which is operated by a fluid (gas or liquid) and is shown in FIGS. 6*a* to 6*d* inclusive and FIG. 7.

The general arrangement of the fluid-operated oscillator relative to the intermittent motion devices of this invention is shown principally in FIG. 7. Only one end of the input shaft 10 for the device is shown, as the other end (not shown) is connected to a source of constant rotation, as previously explained. The shaft 10 is actually the resilient means of the device and is subjected to torsional strain when the fluid-operated oscillator is energized.

The fluid-operated oscillator shown in FIGS. 6*a* to 6*d* inclusive and FIG. 7 includes a stator 8 and a rotor 9. The rotor 9 is generally cylindrical in shape, has an axis of rotation which is coincident with the rotational axis of the shaft 10 (which may be a drum), and is secured to the shaft 10 by a fastener 11 for rotation therewith. The outer periphery of the rotor 9 has a plurality of equally-spaced projections therearound, each said projection having the the curved surfaces 9*b* and 9*f* shown in FIGS. 6*a* through 6*d*. The stator 8 is generally tubular in shape and envelops the projections of the rotor 9.

The stator 8 is actually a plenum 8*a* or chamber for the fluid (liquid or gas) which is used to actuate the oscillator. The plenum 8*a* includes outer cylindrical member 8*b* (FIGS. 6 and 7) and an inner cylindrical wall 8*c*, which are suitably sealed and are concentrically mounted relative to the rotor 9. The outer wall 8*b* is provided with an inlet 8*f*, which is connected to a source of fluid pressure (not shown) to thereby deliver either a gas or a liquid to the plenum 8*a*. The inner wall 8*c* is provided with a plurality of groups of discharge ports 8*d*, through which the fluid is discharged. Each group of the ports 8*d* is arranged on a line which is axially aligned relative to the axis of the rotor 9, and the lines are equally spaced around the inner wall 8*c*. The rotor 9 is also provided with axially aligned slots 9*a*, which are located between adjacent projections thereon to permit the fluid which has been used in the device to pass therethrough.

The fluid oscillator shown in FIGS. 6 and 7 operates as follows. One end of the shaft or drum 10 is supplied with a source of constant-velocity, rotary motion, as previously explained, which causes the rotor 9 to rotate relative to the stator 8. When the oscillator is energized, fluid under pressure passes from the plenum 8*a* through the discharge ports 8*d* and strikes the surfaces 9*b* of the projections of the rotor 9, giving it a forward thrust (counter-clockwise rotation, as viewed in FIGS. 6*a* to 6*d* inclusive), and, after the rotor rotates forward a short distance, the fluid from the discharge ports 8*d* strikes the opposite surfaces 9*f*, giving the rotor a reverse or torque pulse. After striking the surfaces 9*f* and 9*b*, the fluid passes through the slots 9*a*, after which the fluid may be collected and returned to the pressure source by conventional recirculating means (not shown).

The number of groups of discharge ports 8*d* in the stator 8 is equal to D, and the number of combined surfaces 9*f* and 9*b* on the rotor 9 is equal to D, D being equal to the number of effective dwells per revolution of the input member in the device. If the axis relating to the plot of (*ft*) of FIG. 5 is moved to the line 0—0, it will represent the torque pulsation of the fluid-operated oscillator shown in FIGS. 6 and 7. By controlling the fluid pressure to the plenum 8*a*, the excitation power supplied to the resonant system can be regulated.

Torsionally oscillating systems conveniently divide into the following classes: (a) two-mass, one-spring systems; (b) three-mass, two-spring systems; (c) four-mass, three-spring systems; and so on. FIGS. 1*a* and 1*b* show a two-mass, one-spring system in which one of the masses or inertias is taken to be equal to infinity, since, as shown, the spring member (that is, the shaft) is attached to a rigid support. However, the instant application and said copending application are primarily concerned with a free-body torsionally-vibrating system, with only the nodal points thereof undergoing a steady rotation.

Figure 8A:
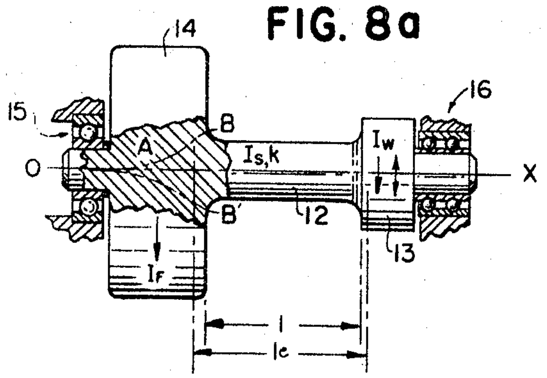
FIGS. 8*a* to 8*d* inclusive are various geometrical models illustrating the principles used in developing this invention.

Therefore, in reality, one is always concerned with a two-mass (or two-inertia) or larger system, because a rotating member with infinite inertia is not a practical reality. In particular, a system with a relatively high shaft inertia (or a high wheel inertia) or with a high combined shaft and wheel inertia will introduce an amplitude of oscillation into a flywheel by the following relation:

Equation 29
$$A_f=A_w\cdot\frac{I_w}{I_f}$$

in which the subscripts *f* and *w* refer to the flywheel and the wheel, respectively, and which are taken to include the net effect of the distributed mass of the shaft. FIG. 8*a* shows how a "flywheel" system, using a torsion shaft 12 as a spring or resilient member, a wheel 13, and a flywheel 14, actually operates under torsional oscillation. As is apparent in FIG. 8*a*, the inertia $I_f$ of the flywheel 14 is much greater than the inertia of the wheel 13, and, during operation of the device with the excitation power on (the oscillator means not being shown), a nodal surface, such as the surface of revolution of the approximate curve OAB, forms about the axis OX. This nodal surface is a surface of revolution only when the materials of the system are homogeneous and it is the only surface of the system which is in steady rotation or constant velocity rotation. In operation, the portion of the shaft 12 and the wheel 13 which are to the right of the nodal surface (formed by the curve OAB) oscillate opposed to the flywheel 14 lying to the left of the surface OABB′, as viewed in FIG. 8*a*. Therefore, all points on the flywheel 14 to the left of said nodal surface will undergo a torsional, low-amplitude vibration. The length of the shaft 12 shown in FIG. 8*a* is obviously not the true acting length of the shaft 12; rather, a longer effective length $l_e$ must be used to obtain the frequency of the system by calculation.

Also, as described in said copending application, the torsion shaft 12 shortens as the torsional shear stress therein increases. Since this decrease of the shaft occurs twice for each cycle of the torsional oscillation, a longitudinal vibration is set up which is two times the resonant frequency of the torsional oscillation. It is obvious that the longitudinal vibration of the wheel 13 is much greater than that of the flywheel 14, and, in cases where said wheels are solid masses, as shown in FIG. 8*a*, the amplitudes of their oscillations are approximately defined by Equation 29.

An interesting effect of the degree of amplitude of torsional oscillation of the system is that a standard ball bearing may function properly at location 15 but quite unsatisfactorily at location 16 of FIG. 8*a*.

Said copending application described a method of isolating the two inertias of the two masses (such as the wheels 13 and 14 of the model shown in FIG. 8*a*) from the effects of shaft shortening by the use of a diaphragm, (as was done in the movie projector embodiment), but there are other spring systems which inherently do not produce this effect. For example, FIG. 8*b*, which is similar to FIG. 8*a*, shows a version of a compression spring used as a torsion member where the design of the spring can determine the rate of torsional stiffness to longitudinal stiffness. As illustrated, the spring would be fabricated from solid bar stock; however, lower frequency systems could utilize conventional wire wound springs.

Figure 8C:
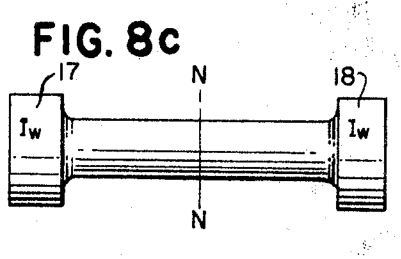
Figure 8B:
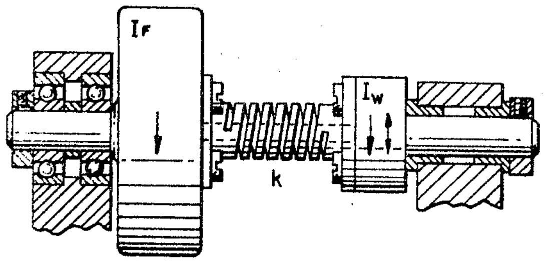

As the inertias of the wheel 13 and the flywheel 14 of FIG. 8*a* approach equality, the nodal surface OABB′ moves to the right and becomes a plane perpendicular to the axis of rotation when the inertias actually do become equal, as shown in FIG. 8*c*. The nodal plane N—N lies midway between the wheels 17 and 18, which have equal inertias, and the torsional oscillations of said wheels are opposed relative to the plane N—N. Therefore, the system of FIG. 8*c* can be excited in two places—namely, at the wheel 17 and at the wheel 18—providing that there is a phase shift of 180 degrees between the two exciters (not shown). As described in said copending application, the drive input for steady rotation can be applied at the nodal plane N—N; however, if this is inconvenient, an alternate drive method can be used.

Figure 8D:
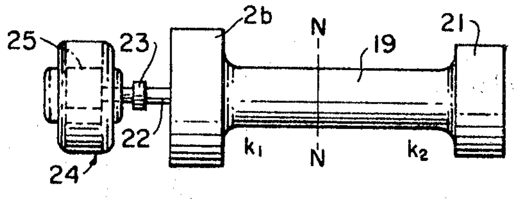

To understand this alternate drive method fully, it will be helpful to consider the torsional stiffness that is required for a system having a given frequency and number of dwells per revolution of forward rotation of the input member. FIG. 8*d* shows the arrangement of a system having two unequal inertias connected by one torsion spring 19, which has spring constants $k_1$ and $k_2$, which are effective from the nodal surface N—N (not a true plane) to wheel inertias 20 and 21, respectively. As far as the mathematics is concerned, the torsional oscillation on each side of the nodal surface N—N is equivalent to the non-rotating system illustrated in FIG. 5*a*.

Referring to the geometrical models of FIGS. 1*a* and 1*b*, the following relationships apply:

$I_w$=the wheel inertia with the effect of the shaft inertia included; and expressed in lb.-in.-sec.$^2$;
$k$=spring constant, expressed in lb.-in./rad of twist;
$\phi_o$=peak angular displacement of $I_w$ relative to the nodal surface, expressed in radians; and
$\dot{\phi}_o$=peak angular velocity of $I_w$ relative to nodal surface, expressed in radians/sec.

From the law of the conservation of energy:

Equation 30
$$\tfrac{1}{2}\,k\phi_o^2=\tfrac{1}{2}\,I_w\dot{\phi}^2$$

and solving for $k$ gives

Equation 31 $$K=I_w\left(\frac{\dot{\phi}_o}{\phi_o}\right)^2$$

If N=the r.p.m. of the steady rotation of the nodal section, then

Equation 32 $$\dot{\phi}_o=\frac{N}{60}\times 2\pi=.10472N$$

because, for a single instantaneous dwell per cycle, the peak angular velocity $\dot{\phi}_o$ of inertia $I_w$, relative to the nodal section, must equal the steady-state angular velocity of the nodal section at the instant of dwell. For a single instantaneous dwell per cycle:

Equation 33 $$\phi_o=\frac{1}{D}$$

Substituting Equations 32 and 33 in Equation 31 gives:

Equation 34 $$k=.011I_w(ND)^2$$

As an example, in a high-speed printer application, as was described in said copending application, the basic elements in the device might have values as follows:

(a) Drum inertia=.02 lb.-in.-sec.$^2$;
(b) Drum speed, steady rotation=1,000 r.p.m.; and
(c) Number of dwells per revolution=64.

From Equation 34, $$k=.011\times.02\times(1000\times 64)^2$$
$$=900,000 \text{ in.-lb. per radian}$$

At the most desirable angle of oscillation, the peak torque in the shaft is, using Equation 26 and multiplying angle $\phi_o$ by the spring rate ($k$) yields:

$$1.11072/64=900,000$$

which equals 15,600 lb.-in. torque max.

Therefore, suppose the power required to overcome damping to be approximately ¼ HP and to be introduced by means of a flexible shaft 22, a coupling 23, and a motor 24, as shown in FIG. 8*d*, which is representative of the principle of operation only. The input torque at 1,000 r.p.m. is:

$$T=.25\times\frac{63,000}{1000}=15.75 \text{ lb.-in.}$$

This input drive torque of 15.75 lb.-in. is three orders of magnitude lower than the peak torque (15,600 lb.-in.) in the torsion spring, and the use of the flexible drive shaft 22 (FIG. 8*d*) permits a steady power to flow into the system with very little effect on the high frequency torsional oscillation. In this system excitation may be applied to the inertia wheel **2*b* or the inertia wheel 21** (FIG. 8*d*) or to both if a phase angle of 180 degrees exists between the exciters, as previously explained.

Specifically, the stiffness of the flexible shaft 22 (FIG. 8*d*) must be such that the auxiliary "spring-mass" system, composed of the shaft 22 and the inertia of the drive means (such as a rotor 25 of the motor 24), is not close to being in resonance with the fundamental mode frequency of the "two-mass (inertia wheels **2*b* and 21) one-spring (shaft 19**)" primary system.

Figure 9:
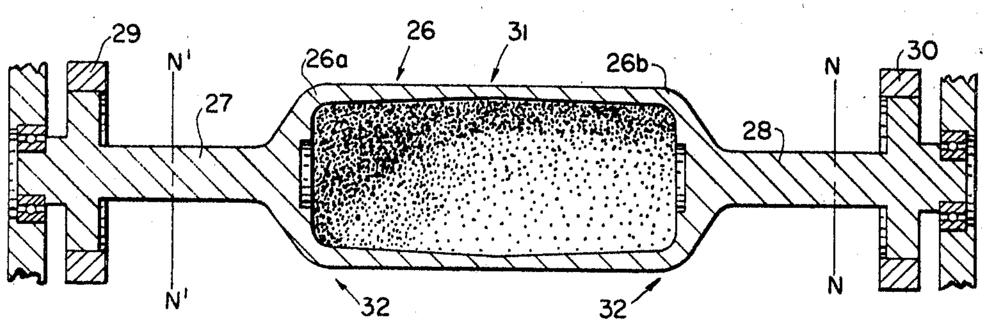
FIG. 9 is a geometrical model of a three-mass, two-spring system used to illustrate the principles of this invention.

FIG. 9 is a cross-sectional view of an essentially "three-mass two-spring" system in which a drum 26 is rigidly connected to torsion shafts 27 and 28 by means of integrally formed connecting sections **26*a* and 26*b*, respectively. Also, the torsion shafts 27 and 28 are rigidly attached to inertia wheels 29 and 30, as shown. This structure is fictional only and was set up as an approximation of a high-speed printer embodiment (such as that shown in said copending application) for the purpose of computing the deflection curve of said drum and torsion bars at a maximum angle of oscillation. Notice that at the connecting sections 26*a* and 26*b***, there are no jointed connections, as in the embodiment in said prior application. The system of FIG. 9 operates basically in the second mode or second frequency of torsional oscillation, as explained in said copending application.

Figure 11:
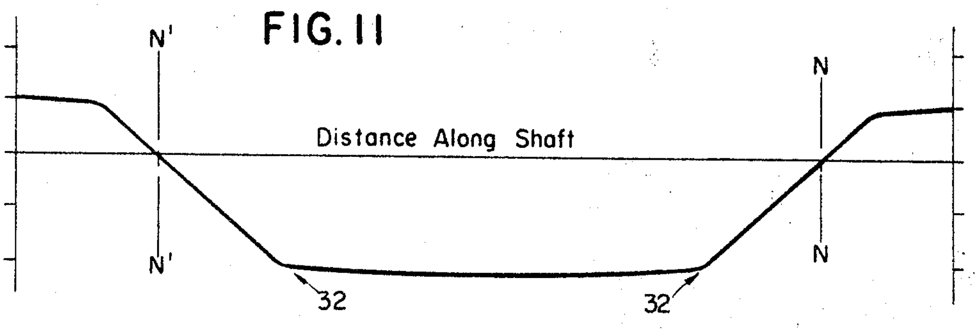
FIG. 11 is a chart used to illustrate the principles of this invention.
Figure 10A:
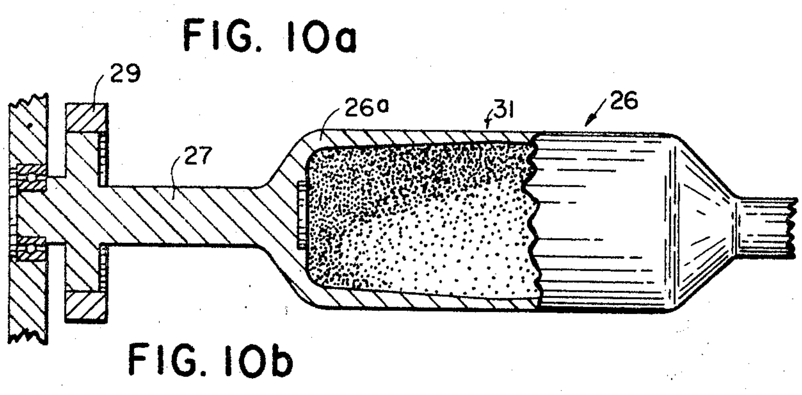
FIGS. 10*a* and 10*b* show a geometrical model and chart respectively, illustrating the principles used in this invention.
Figure 10B:
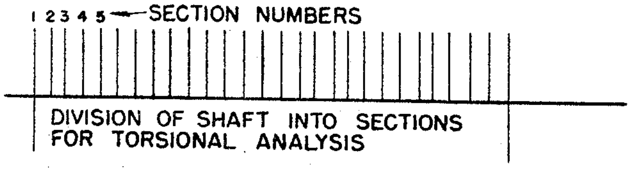

FIGS. 10*a* and 10*b* show how the shaft 27 and the drum 26 of FIG. 9 were divided into circular cross-sections for a computer analysis, and FIG. 11 gives the plot of Angular Deflection vs. the Distance Along the Shaft. Notice that the deflection at the center of the drum, as at 31, is at a maximum, being slightly more than that near the ends of the drum, as at 32 (FIGS. 9 and 11). The deflection curve shown is for an embodiment having a resonant frequency of 640 cycles per second. Increasing the frequency to 1,280 cycles per second more than doubles the difference in deflection between the center 31 and the ends 32. The curve shown in FIG. 11 is for a torsional mode shape (Angular Deflection) at the second torsional natural frequency.

Although the timing of the midpoints of the effective dwells along the drum 26 (FIG. 9) is not changed with the change of angular deflection ($\phi_o$), the characteristics of the effective dwells do change. As the frequency increases, the difference in angular deflection $\phi_o$ between the point 31 and the points 32 increases; therefore, efforts to minimize this difference become important at high frequencies. The description of the system to follow shows improvement in this area as well as in other problem areas previously mentioned.

FIG. 12 is essentially a cross-sectional view of a drum system combined with a schematic block diagram of the control needed for sustaining the torsional oscillation of the drum close to peak resonance and for maintaining a constant angle of oscillation thereof. The system shown could be used where it is necessary to start and stop a drum a given number of times per second, as in a high-speed printer as described in said copending application; however, in FIG. 12 only the control for maintaining the system at resonance is shown, as the projected use may well include uses other than for printer applications.

The drum 33 (FIG. 12) has, on opposed ends thereof, aligned bores **33*a* and 33*b*, which cooperates with torsion shafts 34 and 35, respectively, to provide a secure, shrink-fit connection therebetween, with the best connection being made when the drum and the shafts have complementary splines of the involute variety. A close-tolerance, high-quality fit is necessary at said shrink-fit connection for a smooth operation of the embodiment. Each bore 33*a* and 33*b*** is located approximately one qaurter of the drum length away from its respective closest end of the drum.

The shafts 34 and 35 (FIG. 12) are rotatably supported in the air bearings 45 and 63, respectively, and the outer end of the shaft 34 is fitted into an opening **36*a* of the rotor 36, while the outer end of the shaft 35 is similarly fitted into an opening 37*b* of the rotor 37** to provide the shrink-fit connections mentioned in the previous paragraph.

The rotor 36 (FIG. 12) is magnetically coupled to its associated stator to provide an oscillator 38 or exciter for the shaft 34, as was described in said copending application. Similarly, the rotor 37 is magnetically coupled to its stator to provide an oscillator 39 for the shaft 35.

The stator for the oscillator 38 (FIG. 12) is constructed as follows. Magnet rings **38*a* and 38*b*, having the complementary shapes shown in cross-section, cooperate to form an annular recess, into which the coil 38*c* is positioned. After the coil 38*c* is positioned in said recess, the rings 38*a* and 38*b* are secured together by dowels to enclose the coil 38*c*, and thereby form a sub-assembly which is moved in an axial direction in the circular housing 42 to envelop the rotor 36 and to abut against a shoulder 42*a* in said housing 42. Said sub-assembly is retained in the housing 42 by the circular plate 40, which abuts against the ring 38*a*. The plate 30 is secured to the housing 42 by a thick, washer-shaped plate 43 and fasteners 44. The circular plate 40 also has, in its center, a hole through which the driving shaft 34a may freely pass and rotate. A suitable thrust bearing 41 is positioned in an annular recess on the circular plate 40 to receive the axial thrust of the shaft 34. The housing 42 for the stator of the oscillator 38 is secured to the base 52 by conventional means including bolts 53, nuts 54, guide blocks 55, and a T-shaped slot 52a**.

The air bearing 45, previously alluded to, supports the torsion shaft 34 on a thin film of air. The bearing 45 is conventional and includes upper and lower semi-circular halves 47 and 48, respectively, which are secured together by bolts 46 and in which plenums 47b and 48b are respectively located. Members 47c, which are also semi-circular halves, envelop the shaft 34 and also form an air-tight connection between them and their respective halves 47 and 48 at the joining surfaces 47e. Each of the members 47c has a plurality of conduits 47d equally spaced around its periphery, so as to enable air from their respective plenums 47b and 48b to pass to the contacting surfaces between the shaft 34 and the members 47c to thereby provide a cushion of air on which the shaft 34 rotates. The air passing between said contacting surfaces is, of course, allowed to escape. The air bearing 63 is similar in construction to the air bearing 45, just described.

The intermittent motion apparatus shown in FIG. 12 is supplied with a constant-velocity rotation by the shaft 22, which is actually a reduced-diameter portion of the shaft 34. The shaft 34 has a predetermined flexibility, as previously described in relation to the shaft 22, shown in FIG. 8*d*, and is connected to the drive motor 50 by the coupling 51.

The exciter or magnetic oscillator 39 is substantially the same as the oscillator 38, with the following exceptions. The plate 56, which is similar to the plate 40 of the oscillator 38, has thereon means for mounting one or more magnetic read heads, such as 57a and 57b, which cooperate with a magnetically coated disc 58, which is rigidly secured to the torsion shaft 35 and the exciter rotor 37. A bearing 59 is rigidly secured to the plate 56 to provide a bearing surface for the axial thrust of the shaft 35.

Also secured to the plate 56 is a pin 60, which can be used to angularly position the plate 56 relative to the base 52. This positioning is actually accomplished by loosening the plurality of screws 61 and gently tapping the pin 60 to rotate the plate 56. A set screw 62 keeps the stator ring assembly (similar to the rings 38a and 38b of the oscillator 38) from rotating while making the adjustment to position the plate 56. The air bearing assembly 63 is mounted on the housing 64, which is in turn also mounted on the base 52.

When air is supplied to the air bearings 45 and 63, the complete rotating assembly literally floats on air, the only friction occurring at the thrust bearings 41 and 59, which are made of an anti-friction material, such as porous bronze. The use of the air bearings 45 and 63 allows the shafts 34 and 35 to flex in torsion without contact with any solid material. Since the surfaces of the torsion shafts are surfaces of maximum stress at the maximum angle of oscillation $\phi_0$, the importance of this feature can become important in preventing fatigue failure of highly-stressed, torsion-shaft-type spring elements.

The magnetic oscillators 38 and 39 (FIG. 12) have pins 38d and 39d, which can be used to angularly position the stator ring elements (such as 38a and 38b of the oscillator 38) by loosening the screws 44 or the screws 61, respectively, as required. Normally, both stators can be phased by adjusting only one stator assembly, as follows: Assume that the magnetic oscillator 39 is locked down tight; that is, the screws 61 and the set screw 62 thereof are tightened, and the screws 44 of the left oscillator 38 are loosened. If a D.C. voltage is then applied to both exciter coils (the coils 38c and 39c), the magnetic forces created will exert torques to line up the respective rotor and stator teeth of each said oscillator. In the process, the magnet rings 38a and 38b of the oscillator 38 will rotate together in the housing 42 to accomplish the phasing operation, and, when finished, with both coils 38c and 39c remaining energized, the screws 44 are tightened securely.

If the drum 33 of FIG. 12 has thereon type characters which are equally spaced around the perimeter of the drum, and if the number of characters is equal to the number of effective dwells D per forward revolution of the drum 33, it may then be necessary to rotate both stator assemblies of the magnetic oscillators 38 and 39 in order to phase the effective dwells of the drum 33 so as to align the characters with a stationary reference point, such as the base 52. To accomplish this, the screws 44 and 61 (of the oscillator 38) and the set screw 62 (of the oscillator 39) would be loosened, and, with both exciter coils (38c, 39c) energized, the stator ring elements, such as 38a and 38b of the oscillator 38 and the stator ring elements of the oscillator 39, can be rotated the desired amount to obtain the phasing mentioned in the previous paragraph by tapping tangentially on the pin 38d or 39d (or both). All screws are then retightened while the coils are still energized.

For control of the resonant indexing of the drum 33 (FIG. 12) only, it is desired that one ring of magnetic pulses, to be read by the magnetic read head 57a, be statically formed and evenly spaced on the coated disc 58, the number of pulses being equal to the number of effective dwells D per revolution. The magnetic read head 57a can be used to measure the steady-state peak angle of oscillation of the rotor 37 as follows:

The computed relation between the angle of oscillation at section X—X and at section Y—Y (FIG. 12) must be known. As previously described, the torsional oscillations at plane X—X and plane Y—Y are opposed to each other and are relative to a nodal surface N—N. For a balanced system, as shown in FIG. 12, the angle of oscillation at plane X—X of the torsion shaft 35 will equal (or very nearly equal) the angle of oscillation at plane X′—X′ of the torsion shaft 34. Likewise, the angle of oscillation at plane Y—Y of the rotor 37 will equal (or very nearly equal) the angle of oscillation at plane Y′—Y′ of the rotor 36. Mathematical means for accurately calculating the amplitudes of torsional oscillation at planes X—X and Y—Y relative to the nodal surface N—N have been known for a considerable length of time. However, due to the effects of the distributed mass of the drum 33 and the torsion shafts 34 and 35, the exact calculations are too laborious without the use of a computer analysis, such as that referred to in reference to FIGS. 9, 10, and 11.

If it be assumed that the structural elements of the system have been so designed that the angle of oscillation at planes X—X and X′—X′ equals the angle or oscillation at planes Y—Y and Y′—Y′, respectively (relative to the nodal surfaces N—N and N′—N′), it is relatively easy to describe how it is possible to monitor the steady state oscillation of the drum 33 at the planes X—X and X′—X′.

Further, if it be also assumed that an effective dwell according to Equation 26 is desired (one in which the dwell occurs for one fourth of the total cycle), the following may be done. Since $f=ND/60$ for the self-excited system, the derivative of Equation 27 may be converted to:

Equation 35

$$\dot{\theta}_{\text{max.}}=\frac{2\pi f}{D}+\frac{2\pi f}{D}[1.11072 \cos 2\pi$$

$$=2\pi N/60\times[1+1.11072] \text{ rad./sec.}$$

$$\dot{\theta}_{\text{max.}}=.22103N \text{ rad./sec.}=2.11072N \text{ r.p.m.}$$

where N is the r.p.m. of the rotor 37 while undergoing steady rotation at resonance, and $\dot{\theta}_{Max.}$ is the steady-state peak angle of oscillation of the rotor 37.

Therefore, the first step to measure this peak angle is to plot the peak-to-peak voltage output of the magnetic read head 57*a* vs. the steady rotation N' of the system with the exciter coils 38*c* and 39*c* (FIG. 12) deenergized, from zero r.p.m. to the r.p.m. defined by Equation 35, above. In this instance, means must be provided for driving the shaft 34*a* at a series of selected speeds and for monitoring the voltage output of the magnetic read head 57*a* at each speed. The voltage plot vs. r.p.m. should be a straight line function, and the linear relationship will be used in the next step.

Assuming that the stators 38 and 39 (FIG. 12) have been phased as described previously, and with the set screw 62 tightened, the screws 61 are loosened slightly, so that it is possible to rotate the plate 56 by gently tapping on the pin 60. The system is now brought into resonance by manually controlling the voltage to drive motor 50, using the method described in connection with FIG. 1*f*. To accomplish the purpose at hand, the voltage impressed on the exciter coils 38*c* and 39*c* must be sufficient so that a noticeable angle of oscillation will be established, and it is necessary to energize the exciter coils before the rotating system is brought all the way up to the resonant speed.

The method used for determining whether or not an angle of oscillation is established is to look at a point on an active element undergoing the intermittent motion, such as the rotor teeth 37*b* of FIG. 12. As the angle of oscillation is increased to $1/D$ radians, the effective dwells, which are visible to the naked eye, become sharper and sharper, and, at angles near the ideal of $1.11072/D$, these dwells appear as though they were produced by a stroboscopic light.

With an angle of oscillation established and maintained at a steady-state condition, the plate 56 (FIG. 12) is slowly rotated until the voltage from the magnetic read head 57*a* becomes a maximum. Depending upon the angle of oscillation during this operation, it is possible for the read head 57*a* to read anywhere from a peak positive voltage down through zero to a peak negative voltage per cycle as the plate 56 is rotated. After the maximum is established, the screws 61 are tightened, and the unit is ready for operation.

The magnetic read head 57*a* (FIG. 12) is now adjusted so that the peak voltage generated thereat corresponds to the maximum angular velocity of the torsional oscillating system, as at the points *p* on the curve of FIG. 5*d*. Therefore, if the steady rotation (N r.p.m.) is determined from the plot of voltage vs. r.p.m. from (1) above, using as the voltage the output value from the read head 57*a*, the actual angle of oscillation is easily determined by the following relation:

Equation 36

$$\phi_o = \frac{N' - N}{ND}$$

where N is again the r.p.m. of the steady-state rotation of the nodal surfaces at resonance.

It must be understood that the above two steps are only for the purpose of obtaining an absolute indication of the magnitude of the angle of oscillation of the system. In actual practice, the technique is much simpler, since the voltage pulses from the magnetic read head 57*a* (FIG. 12) can be converted to a steady-state D.C. signal which is directly related to the peak values. As shown in the block diagram of FIG. 12, this reconstituted signal can be compared to a "dummy" signal (which can be manually adjusted if desired) in a circuit which controls the voltage to the electric motor 50, which supplies power to overcome the damping and other power losses at resonance. By this means, a simple servo loop is placed in operation for maintaining a constant angle of oscillation. The quality of the effective dwells can be readily observed by an operator, at a point such as 37*b* (FIG. 12), and a nearly optimum condition can be achieved by a manual adjustment of the exciter voltage to the coils 38*c* and 39*c* or by an adjustment of the D.C. level of the "dummy" control signal, or both.

Other read heads, such as 57*b*, can be added to the assembly of the plate 56 (FIG. 12) for the purpose of clocking the position of the effective dwells of the drum 33. However, these other read heads must be of the "Hall effect" type, which are not responsive to the velocity of the disc 58 but are responsive only to the presence and intensity of the stored magnetic field. For example, the use of six "Hall effect" read heads 57*b*, spaced angularly apart around the axis 49 of the shafts 34 and 35 and at different radii therefrom, can be used to binarily monitor the position of sixty-four effective dwells per cycle, using a Gray or similarly coded disc arrangement.

Vibrations which are normal to the surface of the drum 33 (FIG. 12) create objectionable sound, and rings 33*c* are used to deaden these vibrations. The principle used is well known (see "Mechanical Vibrations," by Den Hartog, Fourth Edition, pages 105 and 106) and requires that the rings 33*c* be shrink-fitted into the inside diameter of the drum 33 (as shown), so that the contact pressure or clearance between the rings and the drum falls within a certain range. If the rings are too tight or too loose, no sound deadening will result. A few tack welds, as at 33*d*, at each end of the drum are used to prevent the damping effects of the rings 33*c* from reducing the amplitude of the torsional vibrations.

In operation, the stators 38 and 39 (FIG. 12) receive D torque pulsations per revolution of the forward rotation of the nodal sections N—N and N'—N'. These torque pulsations are similar to those occurring in the stator frame of an electric motor, like the motor 50, and can be a cause of objectionable noise and should therefore be minimized in the usual manner, as by installing vibration dampers on the plate 52, etc.

Attaching the shafts 34 and 35 to the drum 33 (FIG. 12) at sections X'—X' and X—X, respectively, increases the uniformity of the peak angle of oscillation $\phi$ over the full length of the drum from that of the high-speed printer embodiment shown in FIG. 9 of said copending application.

Figure 13:
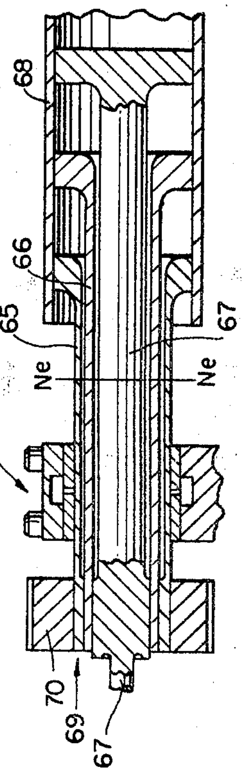
FIG. 13 is a view similar to FIG. 12 but shows only that portion thereof which relates to the resilient means connected to the cylindrical drum, and which view shows another embodiment of the resilient means.

To further minimize changes in drum deflection, more torsion bars, as shown in FIG. 13, can be used. Obviously, drum systems can be devised with one, two, three, or . . . *n* torsion shafts. The system of FIG. 13 has six torsion shafts, two of them being solid and the remaining four being hollow. In FIG. 13, only the left half of the drum 68 and the supporting shafts are shown. These shafts include a hollow torsion shaft 65, a hollow torsion shaft 66, and a solid torsion shaft 67, each having one end attached to the hollow drum 68 by the shrink-fit connections previously mentioned. The remaining ends of the torsion shafts are rigidly attached together at location 69 by shrink-fitting the exciter rotor 70 over the assembly of shafts, as shown. Each said torsion shaft is designed to operate at the resonant frequency of the system in which it is used, and each has a different nodal surface. Therefore, it can be considered that there is one effective nodal surface at each end of the system, such as plane N*e*—N*e* (FIG. 13). Again, the use of a hydrostatic bearing 71 supports one half of the system shown without making contact with the outer torsion shaft 65. An extension 67*a* of the solid torsion shaft 67 serves to input power into the oscillating and rotating system, as described in the other systems.

Although the multiplicity of torsion shafts makes it possible to minimize the differences in angular deflections of the drum 68 (FIG. 12), the added cost of construction makes this system of limited value. These considerations have prompted the construction of resonant devices (those undergoing a torsional oscillation superimposed on a steady rotation) utilizing a "modular concept"; that is, the inertias and the spring element remain constant throughout the full length of the drum.

Figure 14:
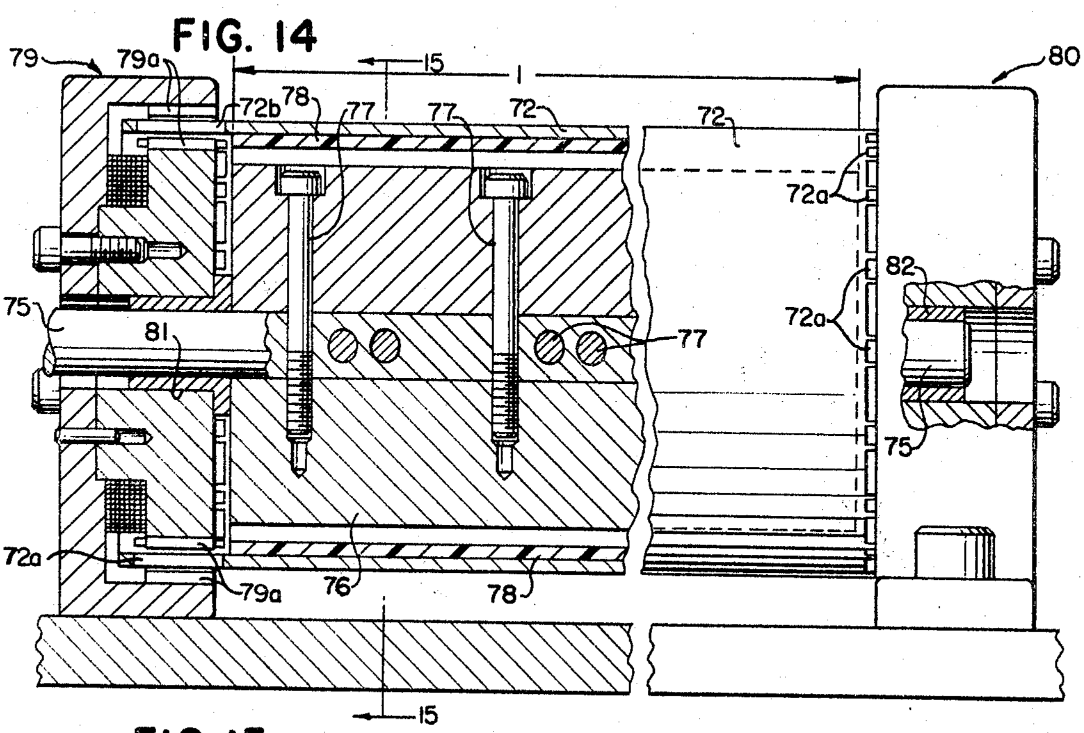
FIG. 14 is an elevational view, partly in cross section, of another embodiment of this invention which uses metal plates as the resilient means to effect a modulator-type construction.
Figure 15:
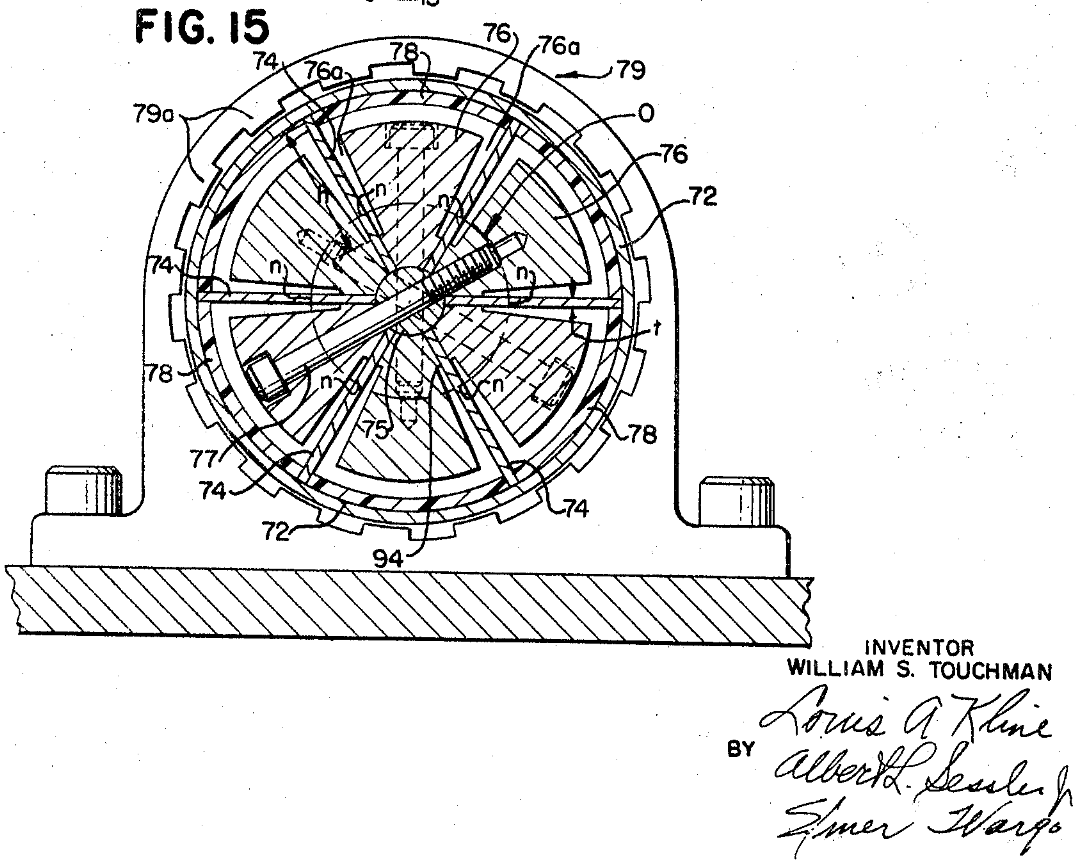
FIG. 15 is an end view, partly in cross-section, and is taken along the line 15—15 of FIG. 14 to show the wedge members which secure the metal plates to the input shaft.

Such a modular concept is shown in FIGS. 14 and 15, in which a cylindrical drum 72, having an "effective" of "active" length *l*, is rotatably supported in the intermittent motion devices as follows. The shaft 75 is rotatably supported in bearings 81 and 82, which are mounted in conventional supporting structure in the device. The resilient members in this device are identical flat strips of resilient material having a length *l* and placed along radial lines from the shaft 75, as shown in FIG. 15. The innermost edges of the strips abut against the shaft 75, and the outermost edges abut against the inside of the drum 72. Wedges 76 are used to secure the strips 74 to the shaft 75 by the wedging action produced when an opposed pair of wedges is drawn together by a fastener 77, which passes through the shaft 75. Each wedge is designed to provide a relief area **76*a* between it and the pertaining strip 74, so as to enable the strip to bend clockwise and counter-clockwise, as viewed in FIG. 15. The outermost edge of each strip 74 is attached to the drum 72 through the use of cylindrical segments 78**, which also extend along the length *l* of the drum. The segments 78 are preferably made of a hard, resilient material and preferably are in considerable compression, so that a high friction surface is provided at the interface **72*a* between the segments and the inside of the drum 72. Suitable adhesives at the interface 72*a* would provide an alternate construction for securing the outer ends of the strips 74 to the inside of the drum 72**.

For the intermittent motion device shown in FIGS. 14 and 15, the resilient members (the strips 74), the wedges 76, and the segments 78 are all equal to the length *l* of the drum 72, and varying the effective drum length *l* does not alter the resonant frequency of the device. The resonant frequency of the device is determined by the combined inertia of the drum 72; the segments 78; the thickness ($t$), the height ($h$), the number, and the material of the strips 74; and the combined inertia of the wedges 76 and the shaft 75.

The oscillators or exciters 79 and 80 for the modular type intermittent motion device shown in FIGS. 14 and 15 may be of the types already disclosed. For example, the oscillators 79 and 80 may be the magnetic type, disclosed in the embodiment of FIGS. 2*a*, 2*b*, 2*c*, 3, and 4. In FIG. 14, the conductor loops **72*b*** (which are similar to the conductor loops 1*a* of FIG. 3) are formed on the drum 72 as shown. These loops **72*b* cooperate with fixed magnetic poles 79*a* and 79*b*** (not shown) to provide the oscillation previously explained.

The drum 72 is rotated at a constant velocity by a motor and flexible shaft (like 22 in FIG. 8*d*), which is connected to the shaft 75 of FIGS. 14 and 15, and, when the oscillators 79 and 80 are energized, the drum oscillates or dwells relative to the shaft 75, with the strips 74 bending to provide the resilient connection therebetween. Since the inner wedge assembly (the shaft 75 and the wedges 76) does not have infinite inertia, the only points of the rotating and oscillating system undergoing pure rotation only are the points $n$ on the strips 74. These points $n$ lie on an imaginary cylinder O, shown in FIG. 15.

In any of the linear systems previously described, it is not always essential that more than one oscillator or exciter be used; however, it is frequently necessary to use two exciters (as in the embodiment of FIGS. 14 and 15) when the system is a three-mass two-spring system in order to achieve the angle of oscillation required for the ideal dwell condition due to the relatively high damping losses present.

The spring-mass or spring-inertia system of FIG. 5*a* is characterized by Equation 2, previously recorded:

$$I\ddot{\phi}+k\phi=0$$

Figure 16:
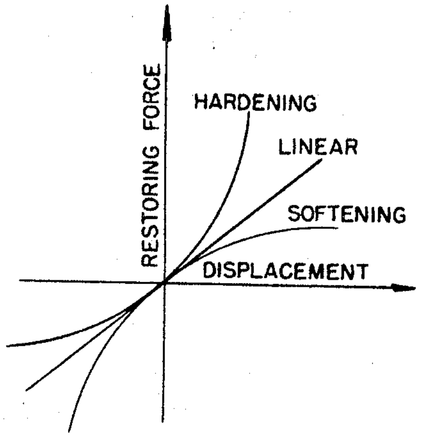
FIGS. 16 and 17 show various graphs used in illustrating the principles of this invention.

This equation is based on the assumption that an elastic spring obeys Hooke's law; that is, the characteristic curve of restoring force vs. displacement is a straight line. However, due to an infinite number of spring designs possible, as well as many spring materials available, many springs do not exhibit such a linear characteristic. When a spring exhibits a characteristic such that the restoring force increases more rapidly than the displacement, it is termed a hardening spring. In a similar manner, when a spring exhibits a characteristic such that the restoring force decreases more rapidly than the displacement, it is termed a softening spring. FIG. 16 illustrates both types of non-linear spring characteristics.

Two main advantages become apparent when a hardening type of non-linear spring is used for the intermittent motion devices of said copending application and the instant invention. First, it is possible to improve the effective dwell characteristics of the device; and, second, it is possible to operate a non-linear system at more than one resonant frequency.

Figure 17:
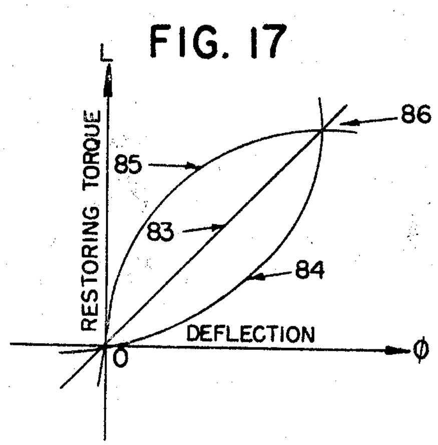

If a linear system is compared to a non-linear system, with each system having the same angle of oscillation, representative curves of both the hardening and softening characteristics of both types of non-linear springs can be plotted on the curve of FIG. 1*c*, giving the result shown in FIG. 17. The straight line 83 of FIG. 17 represents the linear system, while the curve 84 represents the hardening type of non-linear spring, and the curve 85 represents the softening type. The curves 84 and 85 were arbitrarily made to intersect the linear curve 83 at one point 86.

It must be understood at this point that there can be an infinite variety of non-linear curves 84 (FIG. 17) of the hardening type and an infinite variety of non-linear curves 85 of the softening type. Each one of the envisioned curves would correspond to some type of non-linear spring system.

It is most fortunate that a hardening type of non-linear spring is what is needed for an improved intermittent motion device, since it is much easier to construct than the softening type. For example, the modular drum system shown in FIGS. 14 and 15 can be changed to a non-linear system by simply changing the wedges 76 in the relief areas **76*a***.

Figure 19:
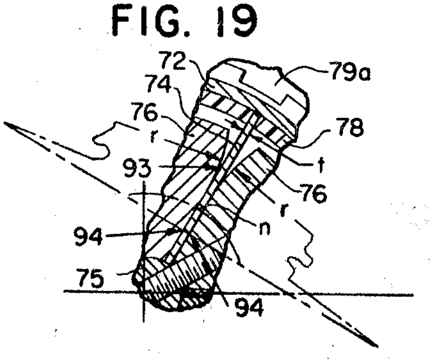
FIG. 19 is a cross-sectional view of another embodiment of the invention which is taken along a plane which is perpendicular to the common rotating axis for the input and output members and in which metal plates (the resilient means of the embodiment) wrap and unwrap upon camming surfaces associated with the rotating input member.

FIG. 19 shows the details of the change in the wedges 76, with most of the numerical notation therein applying to the embodiment shown in FIG. 15. A new curve 93 (FIG. 19) on each side of each wedge 76 is machined tangent to the surfaces corresponding to each face of the flat springs 74. As an example, an arc of a circle of radius $r$ can be used for the curve 93, which is tangent to the surface of the springs 74 at the points 94. During operation of the intermittent motion device in which this changed construction is used, the curves 93 act as camming surfaces and give a hardening characteristic to the spring action. At the instant of the maximum angle of oscillation $\phi_0$, the springs 74 are almost completely wrapped upon the curves 93, and since at this instant the curvature of the spring surface is constant, the stress level is also constant.

Therefore, for the same frequency, the springs 74 can be made a little thinner, resulting in a reduction of the maximum stress which formerly was located at the points 94 (FIG. 15).

Figure 20:
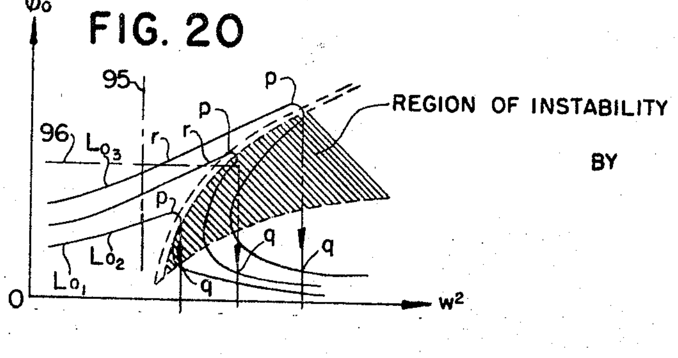
FIG. 20 is a chart in illustrating the principles of this invention.

Operation of non-linear systems is easily understood by referring to FIG. 20, in which the peak angle of oscillation $\phi_0$ of the output member of an intermittent motion device is plotted against the square of the angular frequency of said output member. Suppose that such a non-linear system is to be driven at some very constant speed, as by use of a synchronous motor, for example. The constant speed is represented by the vertical line 95 (FIG. 20), which crosses the exciter curves of torque amplitude $L_{01}$, $L_{02}$, and $L_{03}$, as shown. Therefore, control of the exciter power will have some control of the amplitude of oscillation at one given resonant speed of the system.

Also, if a horizontal line 96 (FIG. 20) is drawn to represent the constant amplitude of oscillation, it becomes apparent that the system will operate at an infinite number of points $r$ over a definite range. Operation at speeds (or frequencies) beyond the resonant peaks $p$ brings the system into a region of instability, as shown in FIG. 20. Operation then can continue by a "jump" down in amplitude, corresponding to the points $q$, again in a region of stability.

The curve $a$ in FIG. 5$c$ shows the improvement in effective dwell characteristics over that of the straight line $b$ of the linear system shown in FIG. 5$c$. It should be understood that every different non-linear spring characteristic will produce a different effective dwell characteristic. In general, however, the hardening type of non-linear spring produces such an improvement in the effective dwell characteristics that only one theoretical instantaneous dwell per cycle need be obtained instead of the two usually used for the linear system.

A non-linear system of considerable interest is one using an air or gas spring as the resilient means acted upon to produce the intermittent motion or dwell. The advantages of an air or gas spring may be summarized as follows:

(1) The mass of an air spring is very low and does not add much inertia to the output member (such as a drum) of the system.

(2) An air spring does not "break" or suffer from "fatigue" failures.

(3) The non-linear characteristics of an air spring can be readily changed by varying the average air pressure to the system.

(4) In some designs, difficult attachment points are eliminated, and output members, like drums, can be readily removed from the apparatus.

(5) Damping of air springs is apparently less dependent on stress level of the material than when springs made of structural materials, like steel, are used.

The above-mentioned important advantages are somewhat offset by the sealing difficulties encountered in sealing some designs, or by the damping loss from air flow in others. Before the system hardware is described, a brief analysis of the air spring theory will be given.

Figure 21:
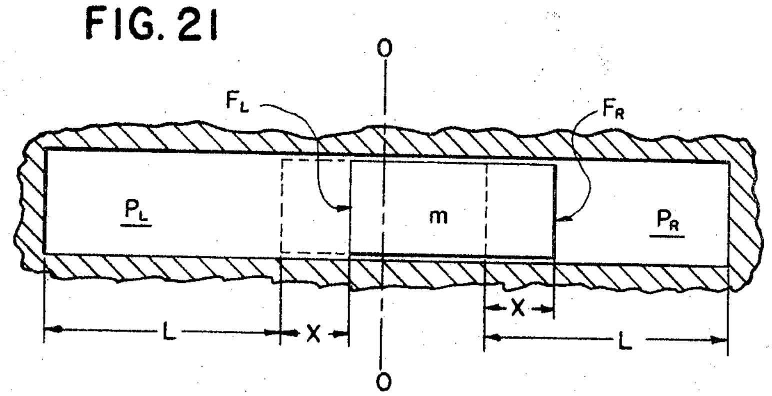
FIG. 21 is a geometrical model used in explaining the principles used in designing those embodiments of this invention which utilizes a compressible gas as the resilient means.

Referring to FIG. 21, the following nomenclature applies to the air spring:

$m$=mass of piston (lbs.).
$x_o$=displacement of piston (in inches) from position where pressure on each side of piston is equal (pressure $P_o$).
$x$=maximum positive or negative displacement of piston during cycle (in inches).
$P_o$=pressure on each side of piston when in the center position (lbs. per square inch).
L=length of air column on each side of piston when in the center position, or when pressures are equal (inches).
A=constant cross-sectional area of air column (square inches).
$v_o$=velocity of piston at time $t=o$ (feet per second).
$v$=velocity of piston at any distance $x$ from center position (feet per second).
$t$=time (seconds).
$\gamma$=ratio of specific heats=1.40 for air.
F=the force created by the acceleration or deceleration of the piston mass $m$ (F=$ma$) at displacement $x$.
$F_x$=resultant elastic force on piston at displacement $x$ (lbs.).
$F_R$=elastic force on right end of piston at displacement $x$
$F_L$=elastic force on left end of piston at displacement $x$.
F=average resultant elastic force on piston between $x$=0 and $x$=$xm$.
$T_m$=absolute temperature of air at maximum displacement amplitude $xm$, high pressure side of cylinder.
$T_n$=absolute temperature of air at maximum displacement amplitude $xm$, low pressure side of cylinder.
$E_m$=resultant or net elastic energy at displacement $x$, ft. lbs.

The development of the equations for the air or gas spring system is based on the following four assumptions:

(1) The motion of piston mass $m$ remains symmetrical to center line O—O during each cycle of vibration.

(2) The pressures within the air columns follows the law of adiabatic compression or expansion ($PV^\gamma$=constant) for the entire analysis.

(3) In the analysis, it is considered that there are no dissipative forces, such as heat loss, friction, or leakage.

(4) The internal pressure is uniform throughout the air columns at any instant.

The equation of motion of the system in free movement is:

Equation 37 $$m\ddot{x}+F_x=0$$

where $m$=mass of the piston, $x$=displacement of the piston, and $F_x$=elastic (pneumatic) restoring force. The elastic restoring forces $F_x$, corresponding to any given displacement $x$, is determined by the unbalance existing between the absolute internal pressures on each side of the piston. The restoring force will always be directed toward the center position of static equilibrium with no external load applied to the system. FIG. 21 shows the nomenclature applying when the piston is displaced from the center position. If the cross-sectional area of the piston and the air column is A, the resultant elastic $F_x$ on the piston at displacement $x$ is Equation 38 $$F_x=F_R-F_L$$

where $F_R$ is the elastic force on the right end of the piston and $F_L$ is the elastic force on the left end of the piston.

Using the adiabatic gas law:

Equation 39 $$P_1V_1^\gamma=P_2V_2^\gamma$$

$F_R$ and $F_L$ can be related to the pressure P on each side of the piston when it is in the center position (shown dotted in FIG. 21). Since volume equals area multiplied by height, the following formulas can be written:

Equation 40 $$F_R=P_RA$$

Equation 41 $$F_L=P_LA$$

and

Equation 42
$$P_R=P_o\frac{(LA)^\gamma}{[(L-X)A]^\gamma}=P_o\left(\frac{L}{L-X}\right)^\gamma=P_o\left(\frac{1}{1-\frac{X}{L}}\right)^\gamma$$

Equation 43
$$P_L=P_o\frac{(LA)^\gamma}{[(L+X)A]^\gamma}=P_o\left(\frac{1}{L+X}\right)^\gamma=P_o\left(\frac{1}{1+\frac{X}{L}}\right)^\gamma$$

Therefore,

Equation 44
$$F_R=P_oA\left(\frac{1}{1-\frac{X}{L}}\right)^\gamma$$

and

Equation 45
$$F_L=P_oA\left(\frac{1}{1+\frac{X}{L}}\right)^\gamma$$

Therefore,

Equation 46
$$F_X=F_R-F_L=P_oA\left(\frac{1}{1-\frac{X}{L}}\right)^\gamma-P_oA\left(\frac{1}{1+\frac{X}{L}}\right)^\gamma$$

Since the elastic force $F_x$ balances the force F of the accelerating (or decelerating) mass $m$, substituting the value of $F_x$ (from Equation 46) in the value of $F_x$ (from Equation 37) becomes:

Equation 47

$$m\ddot{x}+PA\left(\frac{1}{1-\frac{X}{L}}\right)^{\gamma}-P_oA\left(\frac{1}{1+\frac{X}{L}}\right)^{\gamma}$$

When $m$, $\gamma$, $P_o$, L, and A are known, Equation 47 can be solved relating displacement X to time, using a computer analysis.

The kinetic energy of the mass $m$ at $X=0$ is equal to the energy stored in the elastic system at the maximum displacement $X_0$. The magnitude of the maximum displacement may therefore be found without solving Equation 47, since Equation 48 $\bar{F}x_o=\frac{1}{2}\,mv_o^2$ where:

$\bar{F}$=average resultant elastic force on piston between $x=o$ and $x=x_o$;

$x_o$=maximum positive or negative displacement of piston during a cycle; and $v_o$=velocity of piston at time $t=o$, or at the center position.

Using the averaging form of calculus, we can write:

Equation 49

$$\bar{F}_{o-x_o}=\frac{\frac{P_oA}{-a}\int_0^{X_0}\left(\frac{1}{1-\frac{X}{L}}\right)^{\gamma}dx-P_oA\int_0^{X_0}\left(\frac{1}{1+\frac{X}{L}}\right)^{\gamma}dx}{X_o-0}$$

If the values $a=1/L$, and $\gamma=1.40$ for air are used, Equation 49 can be rewritten for integration as follows:

Equation 50

$$\bar{F}_{o-x_o}=\frac{\frac{P_oA}{-a}\int_0^{X_0}(1-ax)^{-1.40}(-a)dx-\frac{P_oA}{a}\int_0^{X_0}(1+ax)^{-1.40}adx=\frac{2.5P_oA}{a}[(1-ax_0)^{-.40}+(1-ax_0)^{-.40}-2]}{x_o}$$

Substituting in Equation 48 and replacing $1/L$ for $a$ results in the following:

Equation 51

$$2.5P_oAL\left[\left(1-\frac{x_o}{L}\right)^{-.40}+\left(1+\frac{x_o}{L}\right)^{-.40}-2\right]=\frac{1}{2}mv_o^2$$

or, writing with positive exponents:

Equation 52

$$2.5P_oAL\left[\left(\frac{1}{1-\frac{x_o}{L}}\right)^{.40}+\left(\frac{1}{1+\frac{x_o}{L}}\right)^{.40}-2\right]=\frac{1}{2}mv_o^2$$

Solving Equation 52 for $v_o$ gives:

Equation 53

$$V_o\sqrt{\frac{5P_oAL}{m}\left[\left(\frac{1}{1-\frac{x_o}{L}}\right)^{.40}+\left(\frac{1}{1+\frac{x_o}{L}}\right)^{.40}-2\right]}$$

If $E_e$=elastic energy at any displacement $x$, then:

Equation 54 $E_e=\bar{F}_x$; and from Equations 49, 50, and 51 by substituting X for $X_o$ yields Equation 55

$$E_e=2.5P_oAL\left[\left(\frac{1}{1-\frac{x}{L}}\right)^{.4}+\left(\frac{1}{1+\frac{x}{L}}\right)^{.4}-2\right]$$

If V=the velocity of the piston at any distance $x$ from the center position, the energy balance can be written as follows:

Equation 56

$$\tfrac{1}{2}mv^2=\tfrac{1}{2}mv_o^2-E_e$$

Solving for V and using Equation 55 for $E_e$ becomes:

Equation 57

$$\frac{dx}{dt}=v=\sqrt{v_o^2-\frac{5P_oAL}{m}\left[\left(\frac{1}{1-\frac{X}{L}}\right)^{.4}+\left(\frac{1}{1-\frac{X}{L}}\right)^{.4}-2\right]}$$

A plot of displacement $x$ vs. velocity is easily made from Equation 57 by incrementing $x$ until the velocity V becomes zero. Accuracy is increased if the $x$ increment is made small, and much time is saved by the use of an electronic computer. However, one needs to know the resonant frequency of the non-linear system, so, if one determines the average velocity $\bar{v}$ at any displacement $x$ by the following equation:

Equation 58

$$\bar{v}=\frac{\int_0^{x}vdx}{x}$$

where $v$ is defined by Equation 57, the corresponding time $t$ can be calculated as follows:

Equation 59 $t=x/\bar{v}$

After the final value of $x$ is determined—that is, when the velocity $v$ becomes zero—the one-quarter-cycle time is computed from Equation 59 to give:

Equation 59*a*

$$t_{(1/4\text{ cycle})}=X_o/\bar{v}_{(1/4\text{ cycle})}$$

Therefore,

Equation 60

$$f=\tfrac{1}{4}t_{(1/4\text{ cycle})}$$

The compression ratio is given by a term found in Equation 57:

Equation 61

$$\text{C.R.}=1-\frac{X}{L}$$

Figure 22:
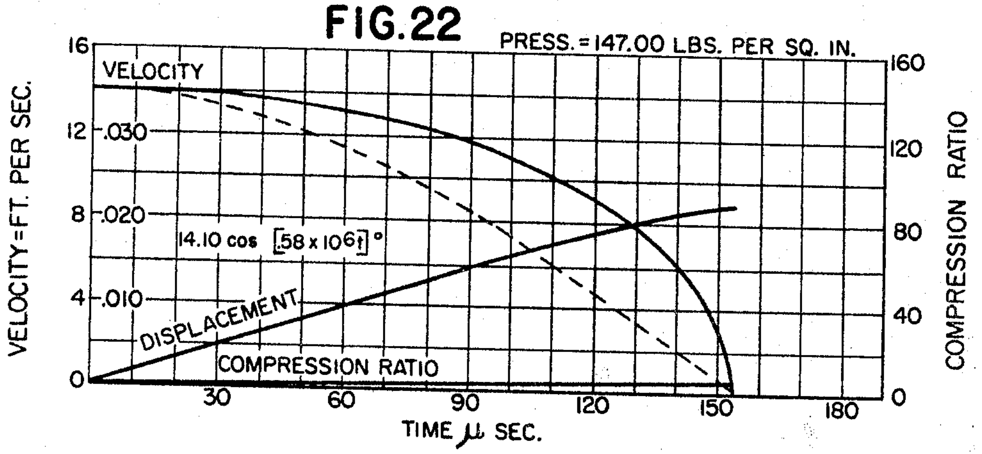
FIGS. 22, 23, and 24 are various charts used in explaining the principles of this invention relative to those embodiments using a compressible gas as the resilient means.
Figure 23:
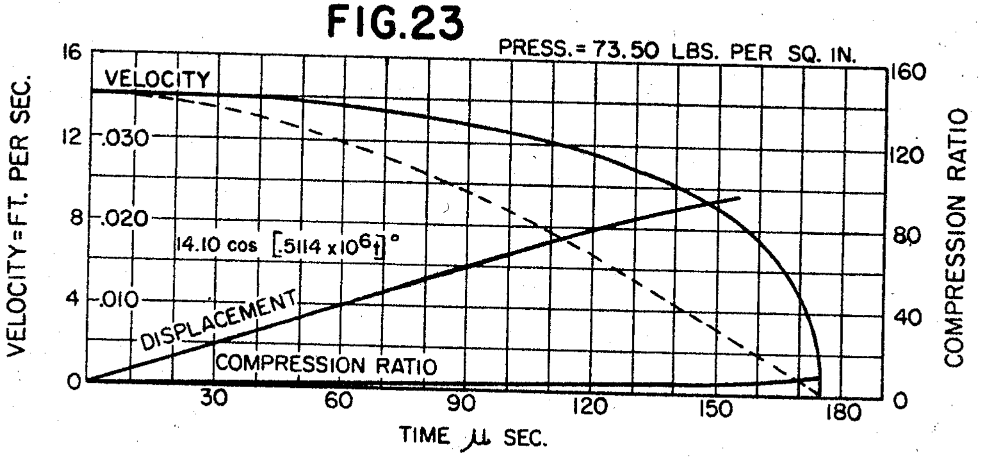
Figure 24:
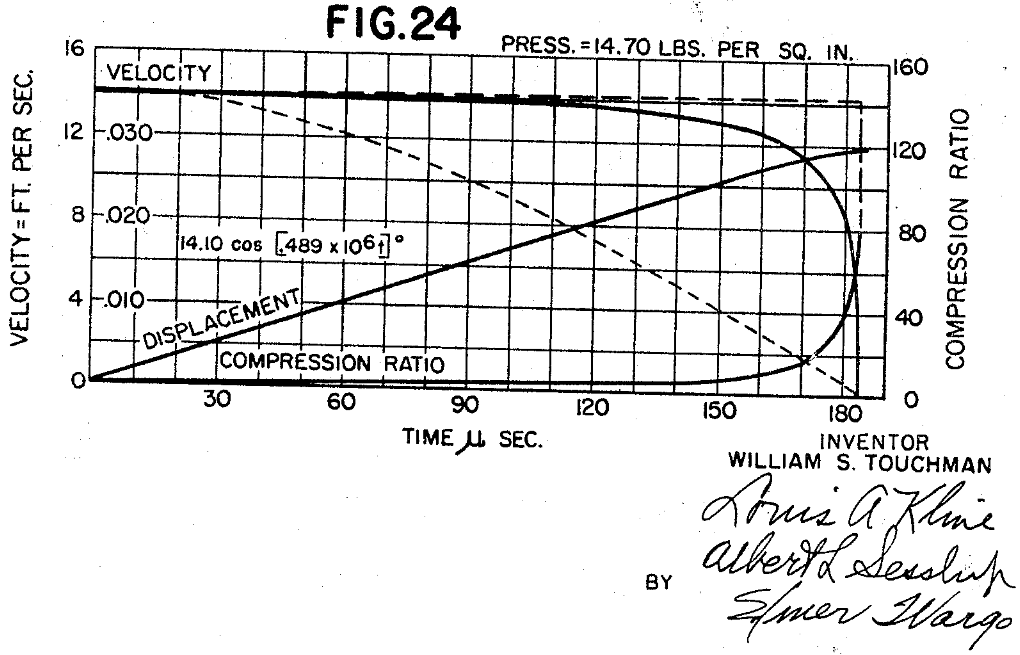

FIGS. 22, 23, and 24 are plots of displacement, velocity, and compression ratio vs. time and show the effect of increasing the initial pressure $P_o$, indicated as PRES in these figures. Notice that, as the initial pressure decreases the velocity of the piston after leaving the center position (that is, after $t=o$) remains essentially constant for a longer and longer period. This means that the effective dwells of an oscillating wheel or drum superimposed on a steady rotation and using an air spring system would have a more nearly perfect dwell with decreasing air pressure. Looking at the curves more closely, however, one notices that, as the air pressure decreases, the final compression ratio becomes greater, implying that severe problems may develop if the pressure is reduced too greatly.

The dotted curve on each of FIGS. 22, 23, and 24 is a plot of velocity vs. time for a harmonic oscillation and, by comparison to the velocity curve for the air spring, the degree of non-linearity of the air spring can be appreciated by observing the area lying between the two curves. The lines 97 in FIG. 24 represent the theoretical situation where the pressure would be reduced to zero and the piston makes an instantaneous reversal at the end of the cylinder. If this hypothetical or limiting condition could be achieved in a rotating system, a perfect ½ cycle dwell would be achieved if the velocity of "oscillation" were exactly equal to the velocity of forward rotation.

It is important to note at this time that the exponents $\gamma$ in Equation 39 are dependent on the gas used in the spring system. For example, if helium gas would be used instead of air, the exponent would increase from 1.40 to 1.66, greatly increasing the non-linearity or hardening characteristic of the gas spring without changing the initial pressure $P_o$.

Figure 25:
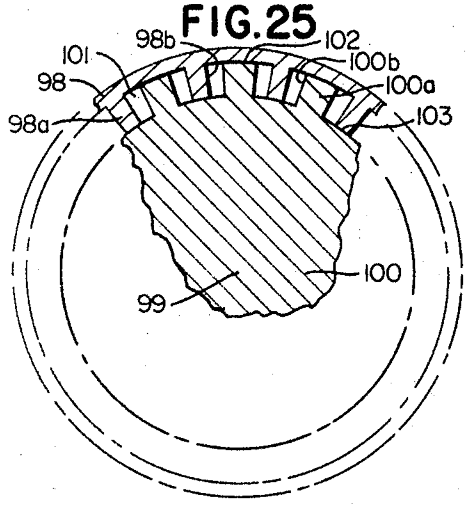
FIG. 25 is a cross-sectional view of a first embodiment of the invention which uses gas as the resilient means and is taken along a plane which is perpendicular to the common axis of rotation for the input and output members.

FIGS. 25 to 28 inclusive show portions of several embodiments of intermittent motion devices using an air or gas spring as the resilient means of the devices. FIG. 25 is a partial cross-section of a wheel or drum 98, which has a plurality of internal teeth **98*a* with straight sides 98*b*, said sides lying in planes which pass through the axis 99 of the wheel or drum. Cooperating with the wheel or drum 98 is a rotor 100, having a plurality of external teeth 100*a*. The teeth 100*a* have straight sides 100*b*, which lie in planes passing through the axis 99. FIG. 25 shows the rotor teeth 100*a* centered in the spaces between adjacent internal teeth 98*a*, so that cavities 101 are formed on each side of the rotor teeth 100*a***.

The outside diameter of the rotor teeth **100*a* (FIG. 25) and the root diameter of the internal teeth 98*a* form a conventional frictionless seal fit at 102 as shown. Similarly, the inside diameter of the internal teeth 98*a* and the root diameter of the external teeth 100*a* form a conventional frictionless seal fit at 103**.

If the ends of the wheel or drum 98 are similarly conventionally sealed with respect to the rotor 100 (FIG. 25), and if the surfaces **98*b* and 100*b* are formed as previously indicated, then the cavities 101 collectively form an air or gas spring. Therefore, if the rotor 100 is rigidly attached to a flywheel (not shown) and driven at a steady rotation, for example, excitation applied to the wheel or drum 98 under the conditions previously described for non-linear systems (and with means identical to that used for the linear systems) will excite the system so that the member 98 will oscillate with respect to the rotor 100** and establish the intermittent motion mode of operation.

The system of FIG. 25 is obviously modular in concept; that is, a change in the length of the wheel or drum 98 (and the rotor 100) does not materially alter the characteristics of operation. Because the beforementioned seal surfaces cannot be made perfectly, some means is necessary to maintain equal cavities 101 on each side of the rotor teeth **100*a*. One means includes the use of a relatively weak mechanical spring (not shown) at one end of the rotor 100-wheel or drum 98 combination arranged to always equalize the cavities 101. If it is desired that the average air pressure is to be greater than atmospheric in the cavities 101**, provision must be made to supply air under pressure, as by a conventional rotary compressed air coupling.

Figure 26:
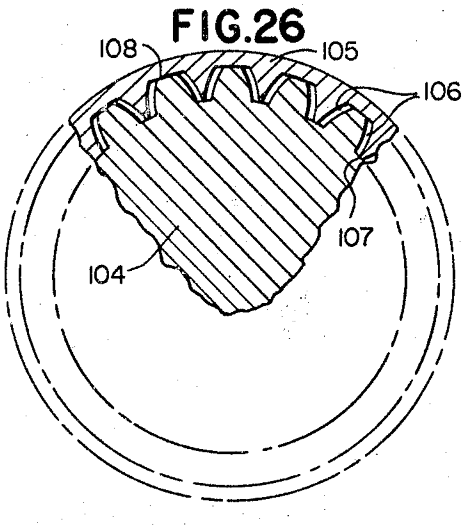
FIG. 26 is a cross-sectional view similar to FIG. 25 but showing another embodiment of the invention.

FIG. 26 is identical to FIG. 25 except that the internal and external teeth are involutes of a circle. This corresponds to a construction in which the rotor 104 is in reality an external, involute spline without root fillets or tip chamfers, and, correspondingly, the wheel or drum 105 is an internal involute spline without root fillets or tip chamfers. In addition, the internal spline has a large allowance for "backlash" which forms the cavities 106 needed for the air or gas spring. In addition, very close fits are required at the surfaces 107 and 108 where the spline major diameters mate with the spline minor diameters.

Figure 27:
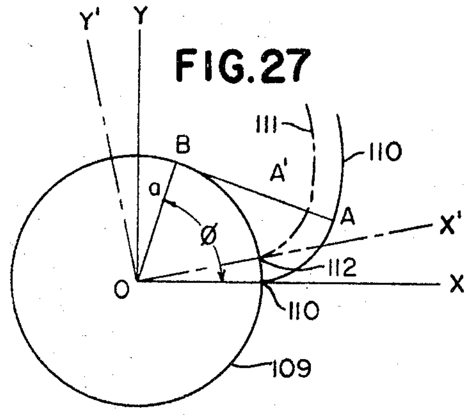
FIG. 27 is a geometrical model used to explain some of the principles of this invention.

The use of surfaces with involute cross-sections, as shown in FIG. 26, has a unique advantage in an air or gas spring construction. FIG. 27 illustrates this advantage and shows the usual presentation where a string unwinds from a base circle 109, which has its center on the origin O of an X–Y coordinate system. Point A on the (imaginary) string generates the involute curve 110 and starts the trace with the string completely wound on the base circle 109 with point A on the OX axis.

Also, another point A' (FIG. 27) on the string may be seen to trace an involute 111 starting at a point 112 on the base circle during the same time that the involute 110 is being generated. Since the distance AA' remains constant, the involutes 110 and 111 are generated parallel to each other, as shown, as are involutes from any curve, not necessarily a circle. However, as used in this invention, a base circle is necessary, since, in addition to the curves' staying parallel, it is essential that the curve 111 mate exactly with the curve 110 as it is rotated (clockwise as viewed in FIG. 27) into the curve 110 about the origin O.

It is easy to see that the involute curve 110 (FIG. 27) matches the involute curve 111, since, if one draws a new coordinate system X'–Y' with OX' drawn through the point 112, the generation of the curve 111 is identical to that previously described for the curve 110. The matching of the curves is necessary so that the air (or the gas) can be squeezed to a very small volume, which occurs at the maximum angle of oscillation $\phi_o$.

Figure 28A:
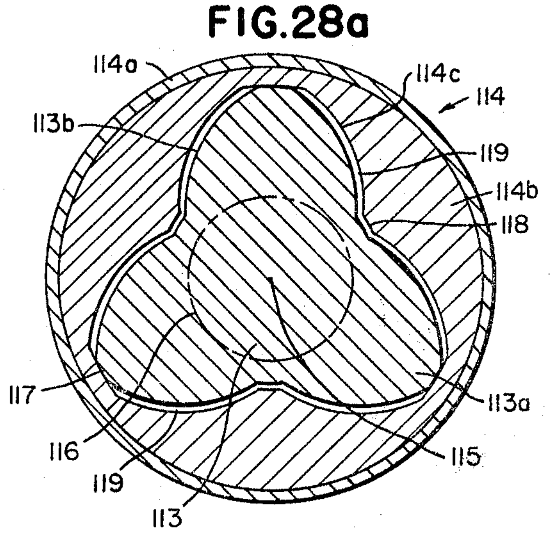
FIG. 28 to 28*c* inclusive are views similar to FIG. 25 but showing different embodiments of the invention using a compressible gas as the resilient means.
FIG. 28*d* is a view similar to the embodiments of FIGS. 28*a* to 28*d* inclusive but showing an air bearing incorporated therein.
FIG. 28*e* is an enlarged view of the portion of the drawing enclosed in the circle of FIG. 28*d*.
Figure 28B:
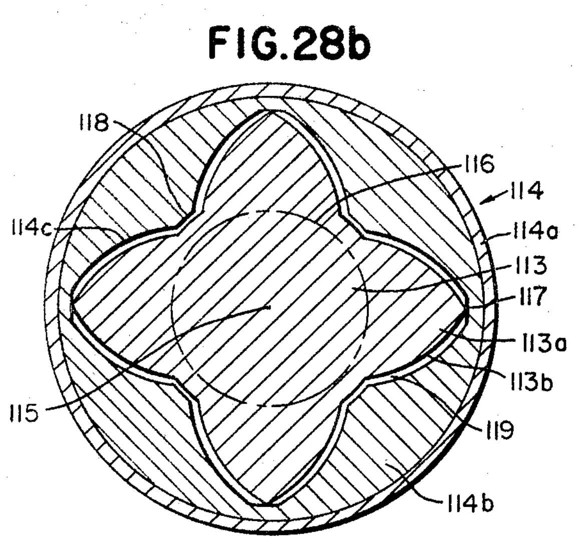
Figure 28C:
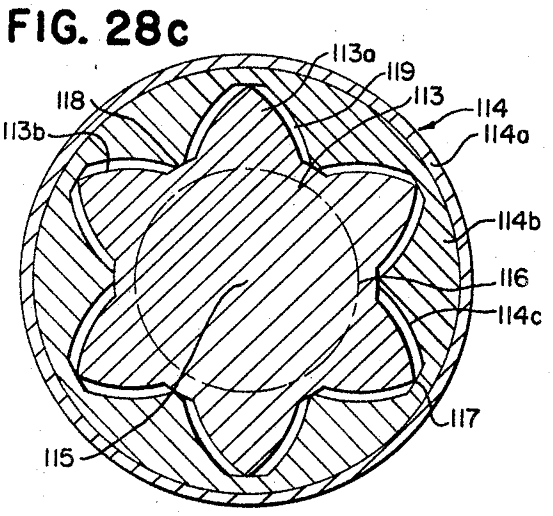

FIGS. 28*a*, 28*b*, and 28*c* show a few of the many possible embodiments of intermittent motion devices using involute curves. Each of the views is a cross-section of a modular drum construction, as previously described, and like numerals refer to corresponding elements in each of the three views. The rotors 113 have a plurality of cam lobes **113*a* with involute surfaces 113*b*, as previously described. A drum 114 is shown as having a thin steel shell 114*a* bonded to a plastic shell 114*b* having involute surfaces 114*c* with the capability of exactly mating with the involute surfaces 113*b* as the drum 114 rotates with respect to the rotor 113 about the axis 115. The involute surfaces 113*b* and the involute surfaces 114*c* have the same base circle 116**.

A plurality of outer seal surfaces 117 and inner seal surfaces 118 in the embodiments of FIGS. 28*a*, 28*b*, and 28*c* aid in entrapping the air (or gas) in the air volumes 119. The air volumes 119 collectively correspond to the volumes on each side of the piston *m* of FIG 21, and the previous analytical derivations made in connection with FIG. 27 are easily applied to these embodiments.

Figure 28D:
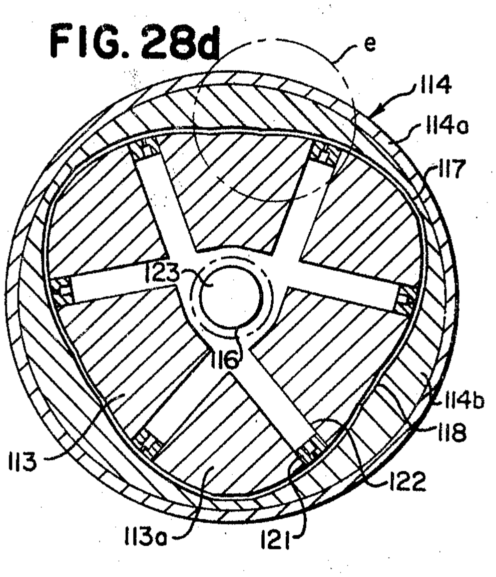
Figure 28E:
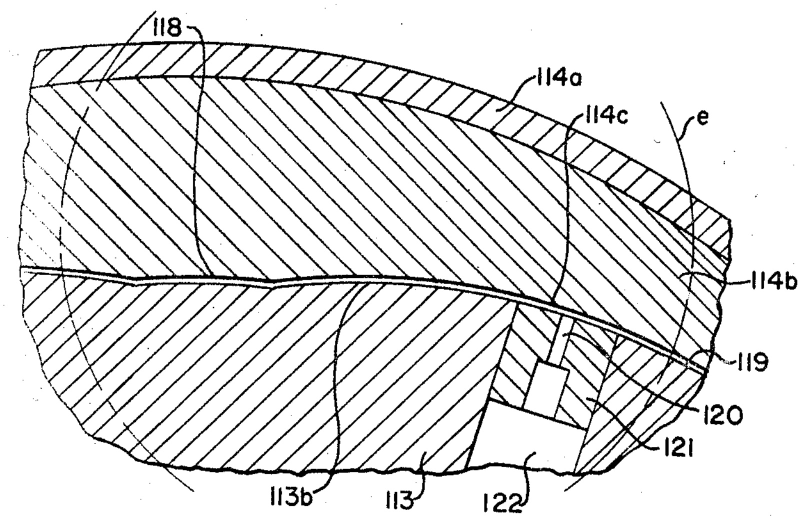

An unusual secondary effect can be obtained by reducing the diameter of the base circle 116 as shown in FIG. 28*d*. The reduction in base circle diameter reduces the distance between the parallel involute surfaces **113*b* and 114*c* to a point where the air spring chambers 119** can be combined with an air bearing surface. FIG. 28*e* is an enlarged view of the circled portion *e* of FIG. 28*d* and shows the air bearing orifice 120 in a plug insert 121 in a hole 122. The rotor 113 shown in FIG. 28*d* has six involute surfaces **113*b*, and for a unit length of the drum system, there is one orifice (in the plug 121) and one hole 122 in each of the six involute surfaces 113*b*. The six holes 122 connect to a hole 123** (FIG. 28*d*) concentric with the axis of the rotor 113. Compressed air is supplied to the hole 123 by means of a conventional air rotary coupling (not shown).

In order that the air bearing surface (FIG. 28*e*) may be maintained properly, some longitudinal air flow is required, the air flow adding some viscous damping to the oscillating system. An unusual feature of this design is the ease of drum removal. The drum 114 simply "floats" off the rotor 113, in a direction parallel to the axis. A rotor of a magnetic exciter, such as the rotor 5 of FIG. 2*a*, can be attached to the steel shell **114*a***, and the magnetic exciter forces, besides supplying torques for the excitation of the torsional oscillation, have been found to be sufficient to keep the drum from moving or floating in the longitudinal direction.

Figure 29:
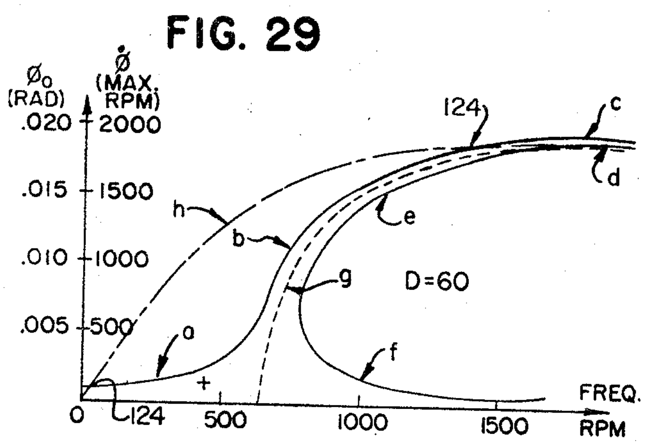
FIG. 29 is a graph illustrating some of the principles of this invention.

In all the involute systems described, the change in the air film thickness in the chamber 119 (FIG. 28*e*) for an angle of oscillation of $\pm\phi_o$ is equal to $(\pm)\ \phi_o$ multiplied by the radius of the base circle, as can be seen from a study of FIG. 27. The resonant diagram for an air-spring system based on the configuration of FIG. 28*d* is shown in FIG. 29 and assumes a harmonic forcing frequency $L_o \sin \omega t$. Similar to the linear systems, the system frequency and the forcing frequency are identical when steady-state conditions are considered. The curve of FIG. 29 represents one level of forcing frequency $L_0 \sin \omega t$ only, and assumes that the damping of the air spring is quite small, which is generally true for this type of spring.

Points *a*, *b*, and *c* correspond to an initial rise, a knee, and a relatively constant amplitude part of the curve of FIG. 29, respectively. The curve *a–b–c* represents the proper operating condition for the air-spring system, while the curve *d–e–f* represents the undesired range, the general conditions for the non-linear system being previously described in connection with FIG. 20. This system is "turned on" in a manner similar to that employed in the linear systems using the electric motor control explained in connection with FIG. 1*f;* that is, the excitation power is energized first and then the system is brought up to operating speed. The dotted curve *g* (FIG. 29) is the "free vibration" curve (zero damping) and is the curve which results from the use of Equations 53 through 60 as applied to a rotary system. The curve *abc–def* and the dotted curve *g* (FIG. 29) are plots of forcing frequency (or system frequency) vs. the peak angle of oscillation $\phi_0$. FIG. 29 represents one particular air-spring system, only, and, for convenience, the number of dwells D per revolution of the steady forward rotation was taken to be 60, as shown. Therefore, since $f=ND/60$, the frequency of the oscillating system for this special case is equal to the r.p.m. of the steady rotation.

Curve *h*, shown as a dashed line in FIG. 29, is a plot of $\dot{\phi}_{max}$ (r.p.m.) vs. frequency or r.p.m. of the rotating system. The quantity $\dot{\phi}_{max}$ represents the peak angular velocity of the wheel or drum 114 relative to the shaft 113 if the latter is secured to a flywheel, or relative to invisible nodal surfaces with an involute cross section lying between and parallel to involute surfaces **113*b* and 114*c*** if no flywheel is used. The points where the curve *h* crosses the curve *abc* correspond to the situations where the angular velocity of the torsional oscillation exactly equals the steady angular rotation of the system and are points where an instantaneous dwell occurs once during each cycle of oscillation. These points are indicated 124 in FIG. 29.

The system must be so designed that no mechanical torques of a transient or undesired nature occur while operating in the steady-state condition at some point on the *c* curve of FIG. 29; otherwise a "jump down" in amplitude to a point along the *f* part of the curve is possible, as previously explained with reference to FIG. 20. In general, the design requirement is that the drum element 114 (FIGS. 28*a*, 28*b*, 28*c*, and 28*d*) must not make physical contact with the rotor 113, but, rather, must always be separated by the air (or gas in the cavities 119).

It has been found that it is better to apply excitation to that element, either drum or rotor, which has the lower inertia, which was also the case for the linear systems, as described in said copending application. It should be apparent from the foregoing description of the air or gas spring systems that there are almost limitless possibilities for "tailoring" the spring design to the specific requirements of the intermittent motion devices in which the springs are used.

Figure 30:
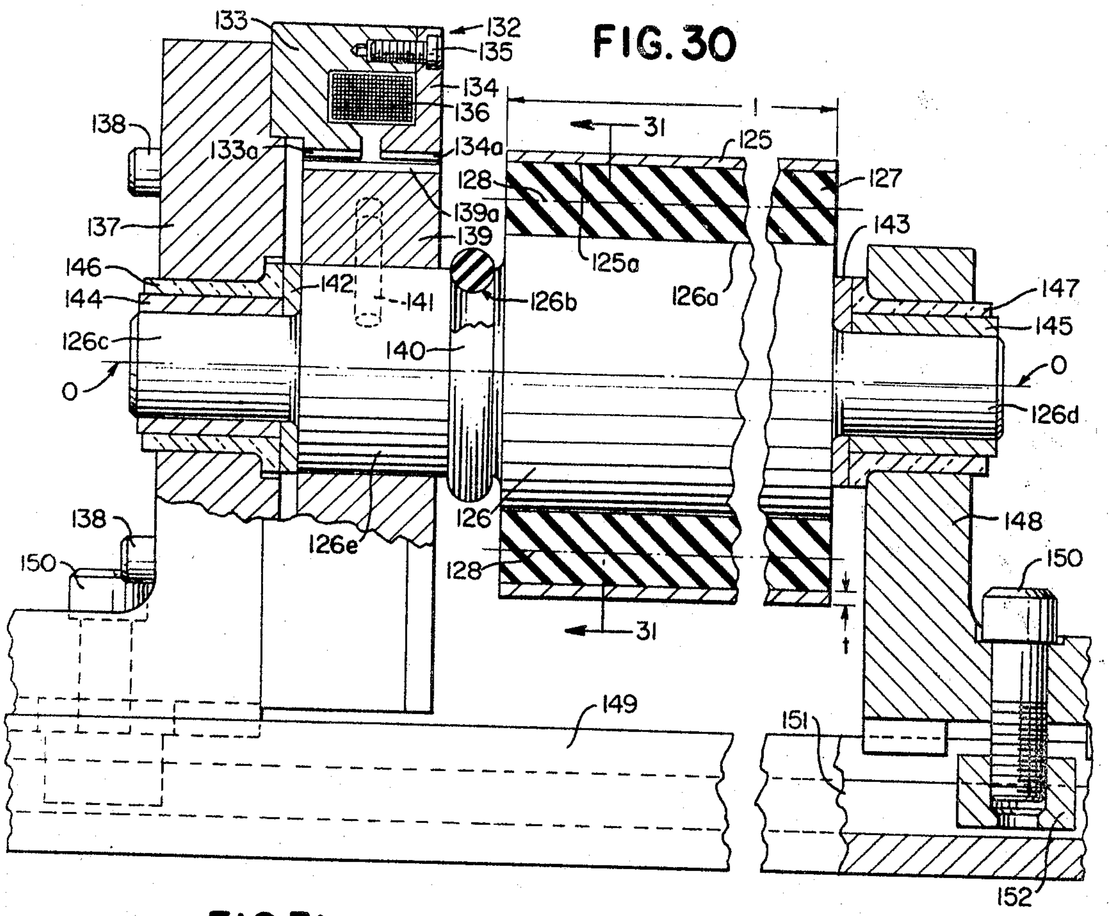
FIG. 30 is an elevational view, partly in cross-section, of an embodiment of this invention which uses an elastomeric spring element which is operated in a shear mode.
Figure 31:
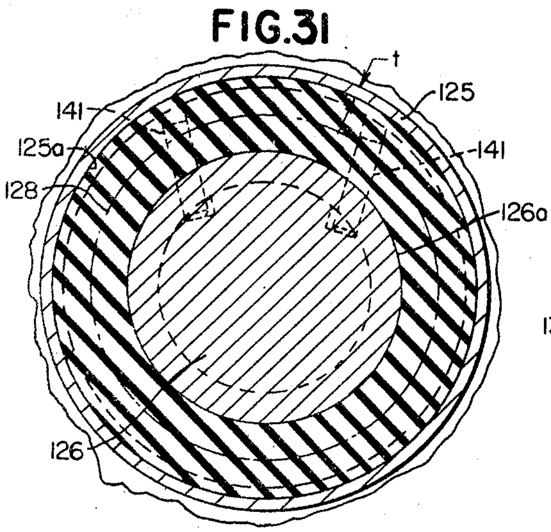
FIG. 31 is a cross-sectional view taken along the line 31—31 of FIG. 30, showing more details of the embodiment.
Figure 32:
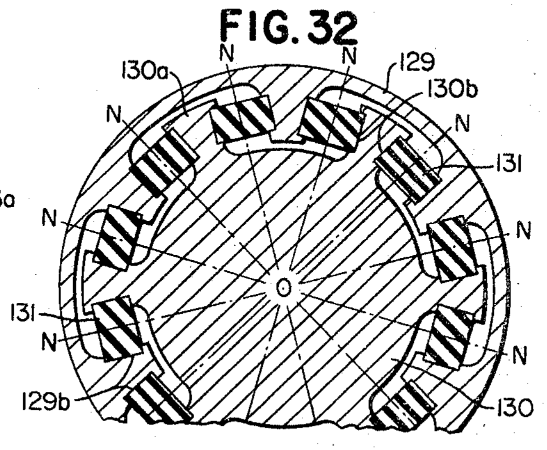
FIG. 32 is a cross-sectional view similar to FIG. 31, but showing an embodiment which uses an elastomeric spring element which is operated in a compressive mode.

FIGS. 30 and 31 illustrate an intermittent motion device using an elastomeric or rubber-like spring element. FIG. 32 is a cross-sectional view, similar to FIG. 31, of an alternate construction of the spring in the system of FIG. 30.

FIG. 30 is an elevational view, partly in cross-section, of a system featuring a drum 125, which oscillates rotationally opposed to a shaft 126, said drum and shaft being bonded or otherwise secured to an elastomeric spring 127 at cylindrical surfaces **125*a* and 126*a*, respectively. The drum 125** is shown as being of uniform cross-section (FIG. 31) and of any length *l*. It should be understood that the drum 125 could be in the form of a wheel, with the length *l* being short and the drum thickness *t* being large.

The only part of the system which is in steady rotation is an imaginary nodal cylinder 128 lying in the body of the elastomeric spring 127, as shown in FIGS. 30 and 31. This spring 127, as represented in the two views, operates in the shear mode and is the preferred construction, primarily because of the simplicity of construction.

An alternate construction of the "mass-spring-mass" system shown in FIGS. 30 and 31 is shown in FIG. 32, in which the spring member is operated in a compressive mode. In FIG. 32, a drum 129 has a plurality of internal teeth **129*a* with recesses 129*b*, said teeth 129*a* and recesses 129*b*** running the full length *l* of the drum. Likewise, a shaft 130 has a plurality of external teeth **130*a* with recesses 130*b*, said teeth 130*a* and recesses 130*b*** running the full length *l* of the drum 129. Inserted between the recesses **129*b* and 130*b* is a plurality of elastomeric bars 131** of rectangular cross section and length *l*, as shown. After assembly, the elastomeric bars 131 are in compression between opposing recesses **129*b* and 130*b* (FIG. 32). In operation, nodal planes ON form, said planes passing through the axis O of the shaft 130. The planes ON lie in the center of the cross-sectional areas of the elastomeric bars 131 (as shown) only when the inertia of the drum 129 equals the combined inertia of the shaft 130. In operation, the elastomeric bars 131 assume various instantaneous values of compressive stress, providing the initial (compressive) stress is sufficient to prevent the complete relaxation of the spring element 131 between the surfaces 129*b* and 130*b* during the part of the cycle of oscillation when a tooth 129*a* is the greatest distance from a tooth 130*a*, said teeth enclosing an elastomeric bar 131**.

The elastomeric spring embodiment shown in FIG. 32 has been presented to illustrate the principles of operation only, and the balance of the structure may be similar to that previously described. As shown, an electromagnetic exciter 132 (FIG. 30) includes a stator ring 133 with internal teeth **133*a*, and a stator ring 134 with internal 134*a*. The rings 133 and 134 are bolted together by screws 135 to enclose a coil 136, and said members are secured to a bracket 137 by screws 138. Cooperating with the stator rings 133 and 134 is a rotor 139 with teeth 139*a***.

The shaft 126 of the embodiment shown in FIG. 32 has a section **126*e* with a groove 126*b* therein to receive a round drive belt 140. The rotor 139 of the exciter 132 is rigidly secured to the shaft part 126*e* by two set screws 141, shown in dotted lines in FIGS. 30 and 31. The shaft 126 also has two sections, 126*c* and 126*d*, upon which are pressed two hardened thrust washers 142 and 143 and two hardened sleeves 144 and 145, respectively. This shaft assembly 126 rotates in the sintered bronze bearings 146 and 147, as shown in FIG. 10. The bearing 146 is pressed into the bracket 137, and the bearing 147 is pressed into the bracket 148, said brackets being secured to a base 149 by means of bolts 150 used in connection with a conventional T-slot 151 and T-nuts 152**.

It is of considerable interest that the mechanisms of said copending application and the present invention have required an investigation of spring materials—in particular, of materials with low internal, or hysteretic, damping. In the past, it appears, there has been little demand for structural materials of extremely low damping, and even more so in the case of elastomeric materials. The use of the latter for springs has been confined to vibration mounts, or vibration absorbers, etc., where a given amount of damping is a necessity.

However, with the great amount of effort in the synthesis and formulation of elastomeric materials, the possibility of materials with a high "Q" certainly exists. It can be stated that many elastomeric materials exhibit a linear "viscoelasticity" up to a range of dynamic shear strain amplitude beyond which the spring-mass system becomes markedly non-linear. The non-linear effect is of the hardening type, and, depending on the amplitude of vibration or oscillation, the mechanism of damping loss is usually quite complex.

In said copending application, a "modulated" type drum embodiment featuring a "magnetic spring" was presented. It has been demonstrated that the damping in a magnetic spring is relatively low, and its adaptability has prompted the concept of a "reverse" magnetic structure.

Figure 33:
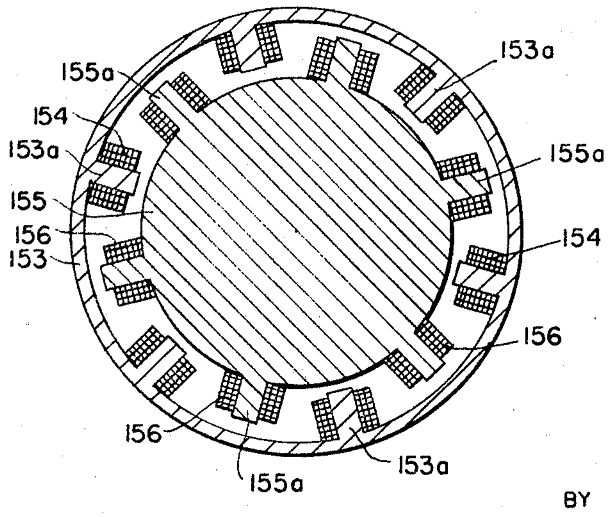
FIG. 33 is a cross-sectional view of a drum and shaft of an embodiment of this invention which utilizes a magnetic spring.

FIG. 33 shows the principle of the reverse magnetic structure and represents a cross-section of a drum (or wheel) system. A drum 153 has a plurality of poles **153*a* extending preferably for the full length of the drum. The poles 153*a* are of magnetic material and are shown as being integral with the drum 153. The coils 154 encase the poles 153*a*** and must be wired in series or parallel in a manner to form uniform poles, as shown in FIG. 33.

Operating between the poles **153*a* (FIG. 33) is a plurality of poles 155*a* extending from a shaft 155. The poles 155*a* are also made of magnetic material and are shown as being integral with the shaft 155. Coils 156 encase the poles 155*a* and must be wired in series or parallel in a manner to form uniform poles, as shown. When all coils are energized, repelling magnetic fields are created, so that the drum 153 "floats" on the shaft 155, so to speak, and a magnetic spring is formed which acts in repulsion between the drum 153 and the shaft 155. Since there is only a small angular displacement between the drum 153 and the shaft 155, flexible leads may be used to connect the coils 154 and 156 at the end of the drum, power being supplied by two conventional slip ring assemblies identical to that presented in the magnetic spring embodiment of said copending application. It is preferred that bearings be used at each end of the drum to position the drum 153 radially with respect to the shaft 155**. It is obvious that reversing the current to all coils will maintain the repelling magnetic field effect, simply reversing the indicated polarity of all acting magnetic poles.

The pole structures as illustrated in FIG. 33 have not been optimized for maximum repelling force and serve only to show the operating principle. The advantage of this system over the one disclosed in the prior application is that there is no tendency for the magnetic forces to cause a mechanical tooth-to-tooth interference, either from wear or from deflection of the shaft or the drum.

As with the prior system, changing the voltage to the coils 154 and 156 (FIG. 33) changes the resonant frequency of the system, which operates primarily in the linear mode, thereby giving an easy means of operating the system over a limited speed range. For a fixed speed system, the structure of FIG. 33 can be replaced with a permanent magnet structure, except that the coils 154 and 156 (and the slip rings, not shown) are eliminated.

What is claimed is:

1. An intermittent motion device comprising:
rotatable input means including resilient means;
means for rotating said input means at a constant velocity;
rotatable output means operatively connected to said input means;
and oscillator means acting upon said resilient means at substantially the resonant frequency of said device so as to cause said output means to effectively dwell a desired number of times for each revolution of said input means while said input means is rotated at said constant velocity;
said resilient means including a plurality of solid resilient members which are positioned along radial lines from the axis of said input means to operatively connect said input means with said output means.

2. The device as claimed in claim 1 in which said resilient members have their innermost ends fixed to said input means and their outermost ends secured to said output means.

3. The device as claimed in claim 2 in which said output means includes a drum member which is concentric with said input means;
and said oscillator means includes an oscillator at each of the opposed ends of said drum member.

4. The device as claimed in claim 3 in which said input means includes support means for adjustably supporting said resilient members between their ends so as to change the hardening and softening characteristics thereof as desired.

5. The device as claimed in claim 4 in which said support means include a plurality of wedge members positioned between adjacent ones of said resilient members and secured to said input means to thereby hold said innermost ends of said resilient members fixed to said input means,
said wedge members being dimensioned to provide a clearance for said resilient members enabling at least the outermost ends thereof to be free of engagement of said wedge members and also being dimensioned to extend in an axial direction for substantially the length of said drum member.

6. The device as claimed in claim 5 in which said wedge members have a curvature adjacent to resilient members so as to impart a hardening characteristic to said resilient members as said resilient members wrap upon said curvatures during the oscillation of said drum member.

7. The device as claimed in claim 6 in which each said oscillator is a fluid-operated oscillator.

8. The device as claimed in claim 6 in which each said oscillator is magnetic.

9. The device as claimed in claim 1 in which said output means includes a drum member whose rotating axis is coincident with the rotating axis of said input means,
said resilient members being generally planar and having first and second opposed parallel sides with said first sides being positioned adjacent to said input means in an axial direction thereto;
said resilient members also being positioned along radial lines from said input means with said second sides being fixed to said drum member;
said input means including a wedge member secured to said input means between each adjacent two resilient members so as to fixedly secure said first ends to input means and to equally space said resilient members thearound,
said wedge members having recessed lateral sides to provide a clearance between adjacent ones of said resilient members enabling at least said second ends to be free of said wedge members.

10. The device as claimed in claim 9 in which said wedge members extend in an axial direction for substantially the length of said resilient members.

11. The device as claimed in claim 10 in which said lateral sides of said wedge members are curved to provide a non-linear spring characteristic to said resilient members as they wrap upon said lateral sides during the oscillation of said drum member.

12. The device as claimed in claim 11 in which said oscillator is magnetic and comprises:
a cylindrically-shaped rotor having an axis coincident with the rotating axis of said input means and fixed to rotate with said drum member;
a stator means having inner and outer cylindrically-shaped walls which are concentric with said rotor and spaced therefrom on opposite sides thereof;
said inner and outer walls having magnetic poles therein in opposed relation with the poles of the opposite said wall;
said cylindrically-shaped rotor having a plurality of conductor loops therein equally spaced around the perimeter thereof so as to form a magnetic coupling with said poles; and
coil means for varying the magnetic field strength between opposing pairs of said poles.

13. The device as claimed in claim 1 in which said oscillator is magnetic and comprises:
a cylindricaly-shaped rotor having an axis coincident with the rotating axis of said input means and fixed to rotate therewith;
a stator means having inner and outer cylindrically-shaped walls which are concentric with said rotor and spaced therefrom on opposite sides thereof to permit said rotor to freely turn therebetween;
said inner and outer walls having magnetic poles therein in opposed relation with the poles of the opposite said wall;
said rotor having a plurality of conductor loops therein equally spaced around the perimeter thereof so as to form a magnetic coupling with said poles;
said inner and outer walls being made of magnetically soft material; and
coil means for varying the magnetic field strength between opposing pairs of said poles.

14. The device as claimed in claim 13 in which the number of pole pairs of said stator means and the number of conductor loops in said rotor is equal to one-half the number of dwells desired per revolution of said input means.

15. The device as claimed in claim 1 in which said resilient members are elastomeric or rubber-like.

16. The device as claimed in claim 15 in which said resilient members are secured to both input means and output means and operate in a shear mode.

17. The device as claimed in claim 16 in which said oscillator means is connected to said input means.

18. The device as claimed in claim 17 in which said output means includes a drum member which envelops said resilient members and has an axis of rotation which is coincident with the axis of rotation of said input means,
said device, when operating, having an imaginary nodal cylinder being located within said resilient members, said nodal cylinder having an axis of rotation which is coincident with the axis of rotation of said input means.

19. The device as claimed in claim 1 in which said resilient members are elastomeric or rubber-like and are operated in a compression mode.

20. The device as claimed in claim 19 in which said input means includes a rotor member having projections extending outwardly in a radial direction from its periphery,
said output means including a tubular cylindrical member depending in a radial direction from the internal diameter thereof so that said last-named projections are alternated between adjacent said projections of said rotor member; and
said resilient members being positioned between adjacent said projections of said rotor and cylindrical members.

21. The device as claimed in claim 20 in which said rotor member is driven at a constant velocity at one portion thereof and has said oscillator means connected thereto at another portion thereof.

22. The device as claimed in claim 21 in which all said projections have recesses to receive said resilient members,
said projections being equally spaced in a circumferential direction on their respective said members,
said recesses of adjacent said projections on said rotor and cylindrical members having walls which are spaced apart a distance to subject the pertaining resilient member inserted therein to a force of compression.

23. The device as claimed in claim 22 in which said projections of said rotor and cylindrical members and said resilient members extend in an axial direction along the axis of said input means.

References Cited

UNITED STATES PATENTS

| | | | |
|---|---|---|---|
| 2,934,339 | 4/1960 | Davis et al. | 226—156 |
| 3,316,769 | 5/1967 | Nordin | 74—1.5 |

MILTON KAUFMAN, *Primary Examiner.*

U.S. Cl. X.R.

74—84; 226—156